United States Patent [19]
Aronsson et al.

[11] Patent Number: 5,377,632
[45] Date of Patent: Jan. 3, 1995

[54] CUTTING OR SAWING MACHINE

[75] Inventors: Tore Aronsson, Mölndal; Ove Donnerdal, Partille, both of Sweden

[73] Assignee: Aktiebolaget Electrolux, Stockholm, Sweden

[21] Appl. No.: 183,395

[22] Filed: Jan. 19, 1994

[30] Foreign Application Priority Data

Jan. 21, 1993 [SE] Sweden ................... 9300179

[51] Int. Cl.[6] ............................................. F02B 77/00
[52] U.S. Cl. .................................. 123/198 E; 123/41.7
[58] Field of Search ................ 123/41.56, 41.65, 41.7, 123/198 E; 55/437, 473, DIG. 14

[56] References Cited

U.S. PATENT DOCUMENTS 5,231,956 8/1993 Lux et al. .................... 123/41.65
5,269,265 12/1993 Pretzsch et al. ............. 123/41.65

FOREIGN PATENT DOCUMENTS 443404 4/1980 Sweden.

Primary Examiner—Noah P. Kamen
Attorney, Agent, or Firm—Michael D. Bednarek

[57] ABSTRACT

The invention relates to a cutting machine, circular saw machine or the like powered by an internal combustion engine. The machine comprises a cutting unit or corresponding unit having a rotational tool, and a power unit, which comprises an air-cooled motor cylinder in a motor room limited by a casing which at least partly consists of a cylinder cover; and an impeller rotatable about the crank shaft with impeller wings, which during rotation propels a cooling air flow outwards toward the periphery of a fan housing and further to the motor room under and inside the cylinder cover. At least a first filter chamber with a filter for intake air for the internal combustion engine is provided over the cylinder cover, and a nozzle tube for the intake air extends from an intake port close to the periphery of the impeller up through the motor room terminating in the at least first filter chamber over the cylinder cover.

10 Claims, 19 Drawing Sheets

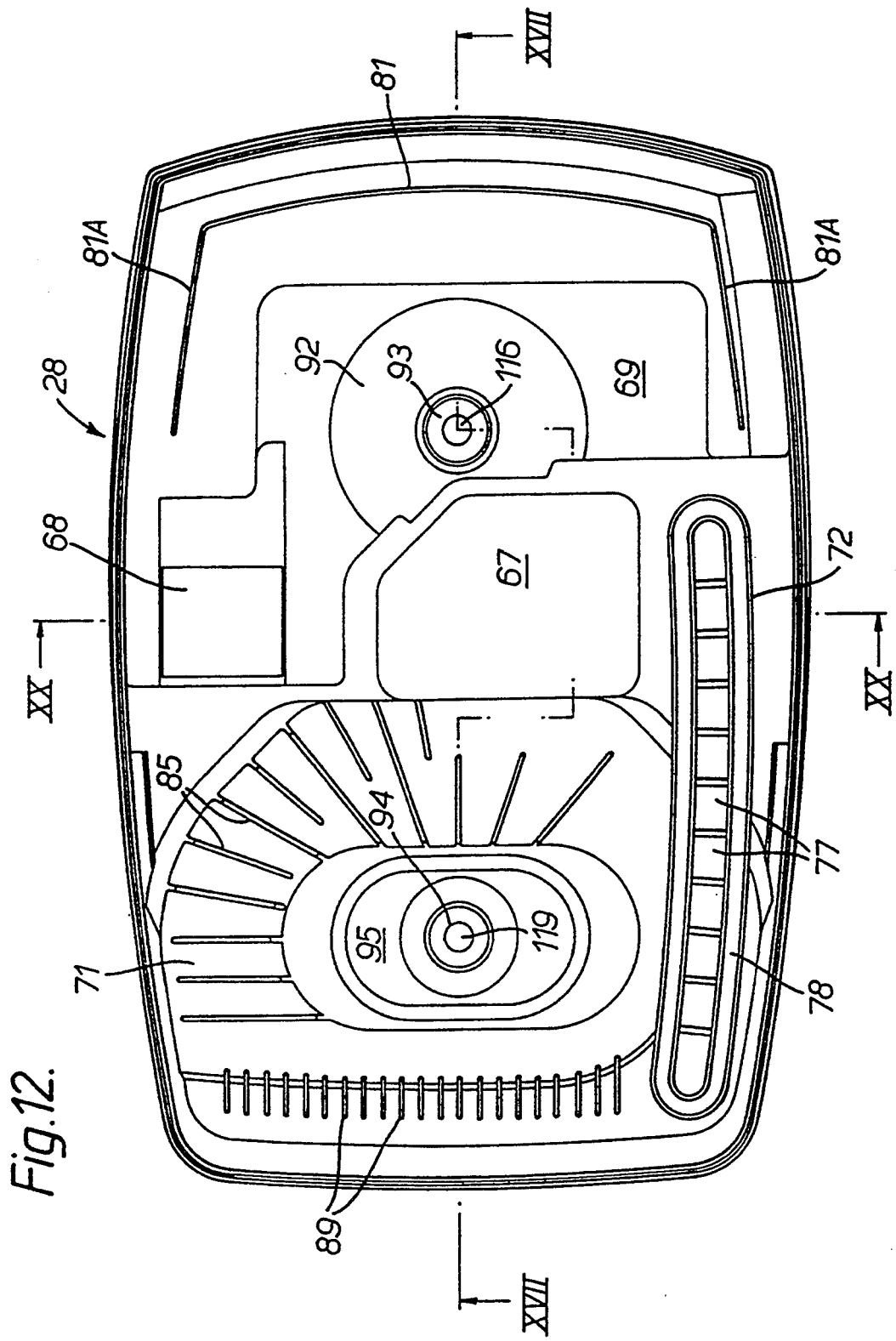

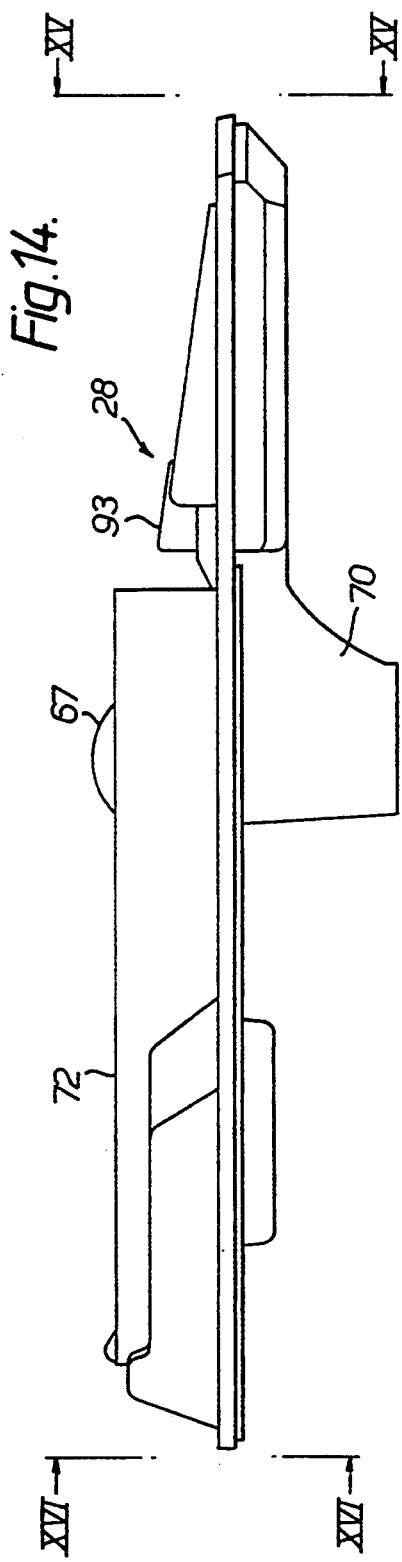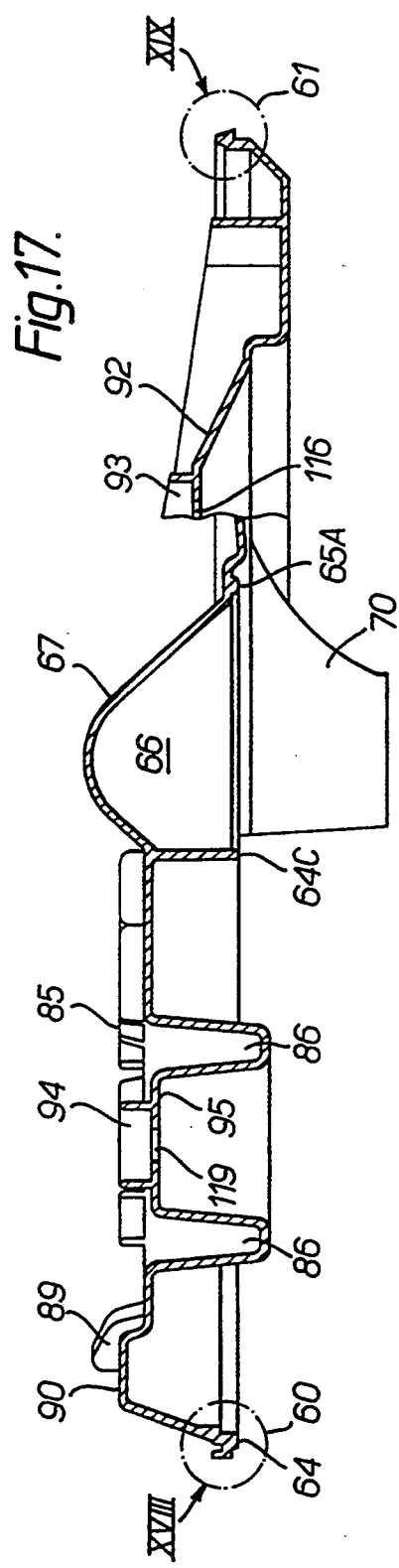

CUTTING OR SAWING MACHINE

TECHNICAL FIELD

The invention relates to a cutting machine, circular saw machine or the like powered by an internal combustion engine and comprising a cutting unit such as a rotational tool, and a power unit, which includes an air-cooled motor cylinder in a motor house located within a casing which comprises a cylinder cover, and an impeller rotatable about a crank shaft and having impeller wings, which during rotation operates to propel a cooling air flow towards the periphery of a fan housing and to the motor room under and inside the cylinder cover.

BACKGROUND ART

Many designs of machines of the above described type are known in the prior art. As the machines generate a tremendous lot of dust, particularly when working in concrete, brick, rock and the like, it is important that the intake air is cleaned well before it is led into the carburettor. Therefore, a plurality of different filter systems have been developed and are in use today. In a cutting machine, which is known under its trade name Husqvarna 272K, there is a pre-filter consisting of an oiled foam plastics filter in the upper front part of the power unit, and a main filter consisting of a paper filter, which is also located in the upper past of the power unit, at the rear of the pre-filter. It is also known to clean the intake air by centrifugal cleaning in chain saws, before it is led into the carburettor. For this purpose, different nozzle (mouth piece) tubes have been developed to be mounted close to the impeller. The purification achieved by means of a centrifugal cleaner alone, however, is not sufficient for cutting machines of the type which generate large quantities of dust. In the prior art there are no cutting machines in which centrifugal cleaning is combined with further cleaning in filters.

BRIEF DISCLOSURE OF THE INVENTION

An object of the invention is to provide a cutting machine with very good cleaning of the intake air in combination with sufficient cooling of the motor cylinder, at the same time as the outer dimensions of the machine are kept within given, narrow limits. Further objects of the invention are to allow a good economy in the production of those parts which are involved in the cleaning of the intake air and the cooling of the machine, and to provide a machine which is easy to assemble and disassemble with a maintained accuracy as far as the mounting of the nozzle tube is concerned, the nozzle tube being a significant member of a centrifugal cleaner in the system.

These and other objects of the invention can be achieved therefor in the invention characterized by what is stated in the appended claims.

Further features and aspects of the invention will be apparent from the following detailed description of a preferred embodiment.

BRIEF DESCRIPTION OF DRAWINGS

In the following description of a preferred embodiment, reference will be made to the accompanying drawings, in which

FIG. 12 is a plan view of the pre-filter chamber floor of FIG. 11;

FIG. 14 is a side view of the right hand side of the pre-filter chamber floor of FIGS. 11 to 13;

FIG. 17 is a section taken along line XVII—XVII of FIG. 12;

FIG. 18 shows the encircled portion XVIII of FIG. 17 to an enlarged scale;

FIG. 19 shows the encircled portion XIX of FIG. 17 to an enlarged scale;

DESCRIPTION OF PREFERRED EMBODIMENT

Figure 1:
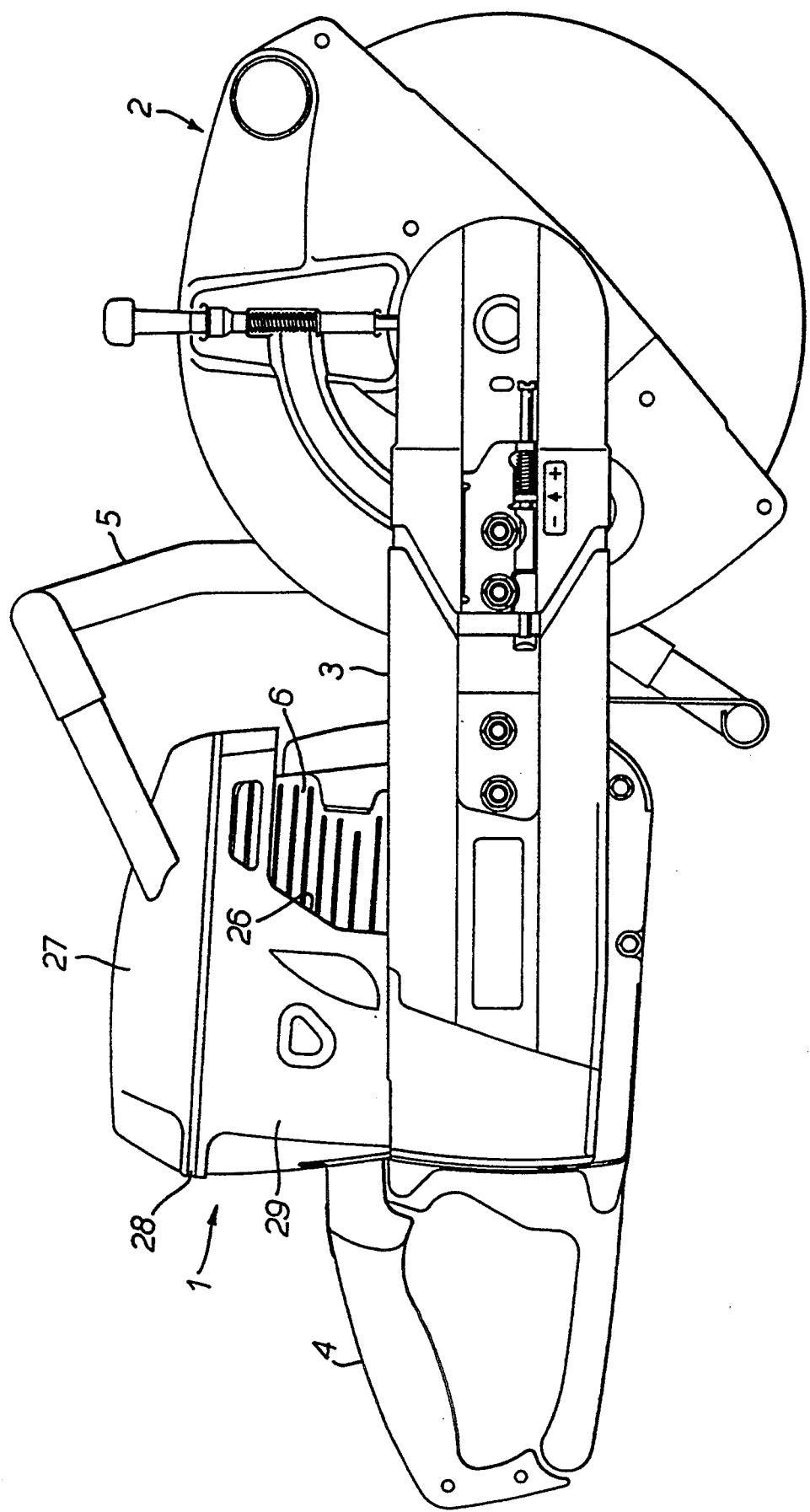
FIG. 1 is a side elevation of a cutting machine in accordance with the invention as viewed from the right.

In FIG. 1 there is shown a cutting machine, the main parts of which are a power unit 1, a cutting unit 2, a cutter arm 3 between the power unit 1 and the cutting unit 2, a rear handle 4 and a front handle 5.

Figure 2:
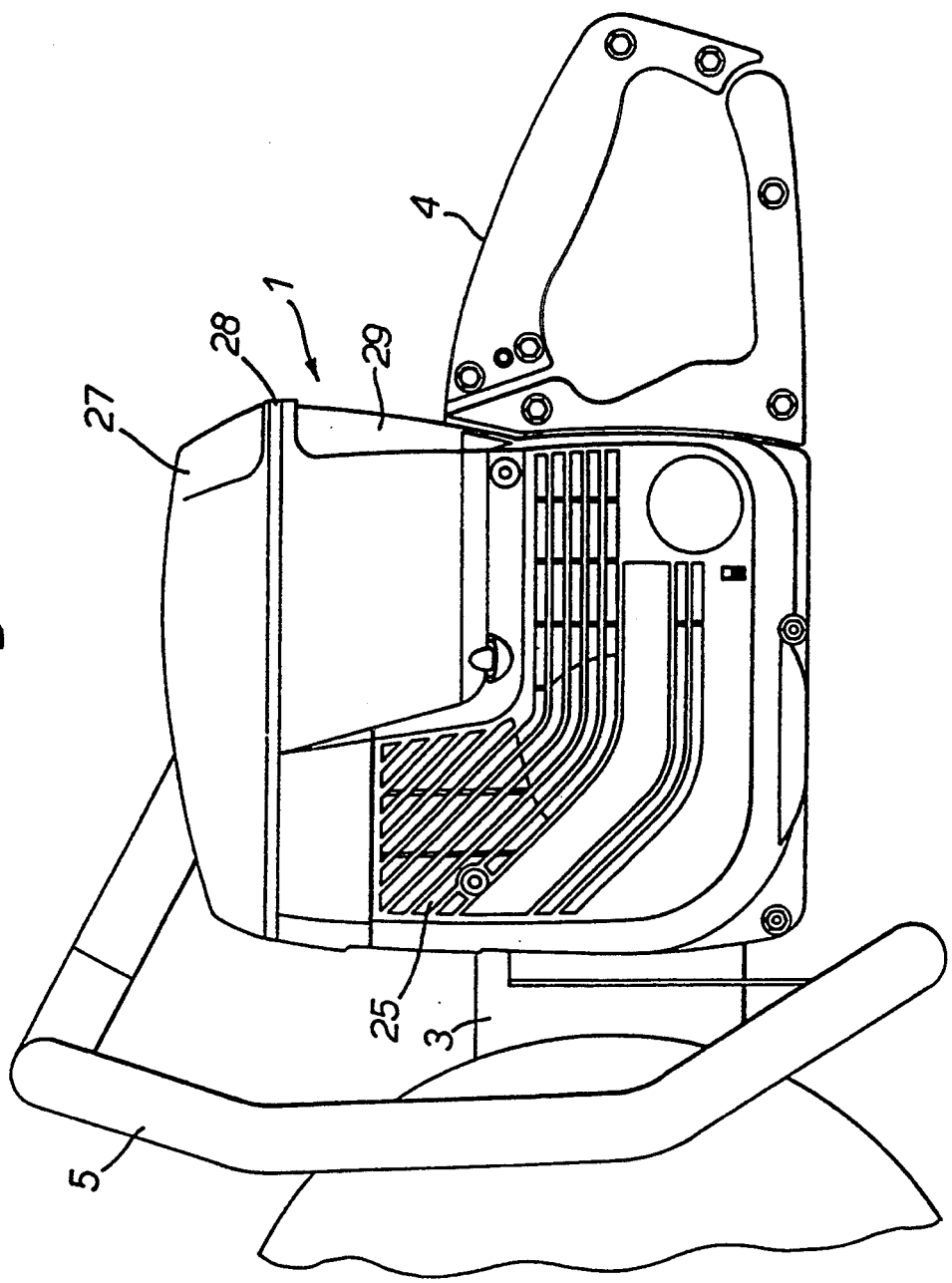
FIG. 2 shows a power unit of the machine as illustrated in FIG. 1 from the left side.
Figure 5:
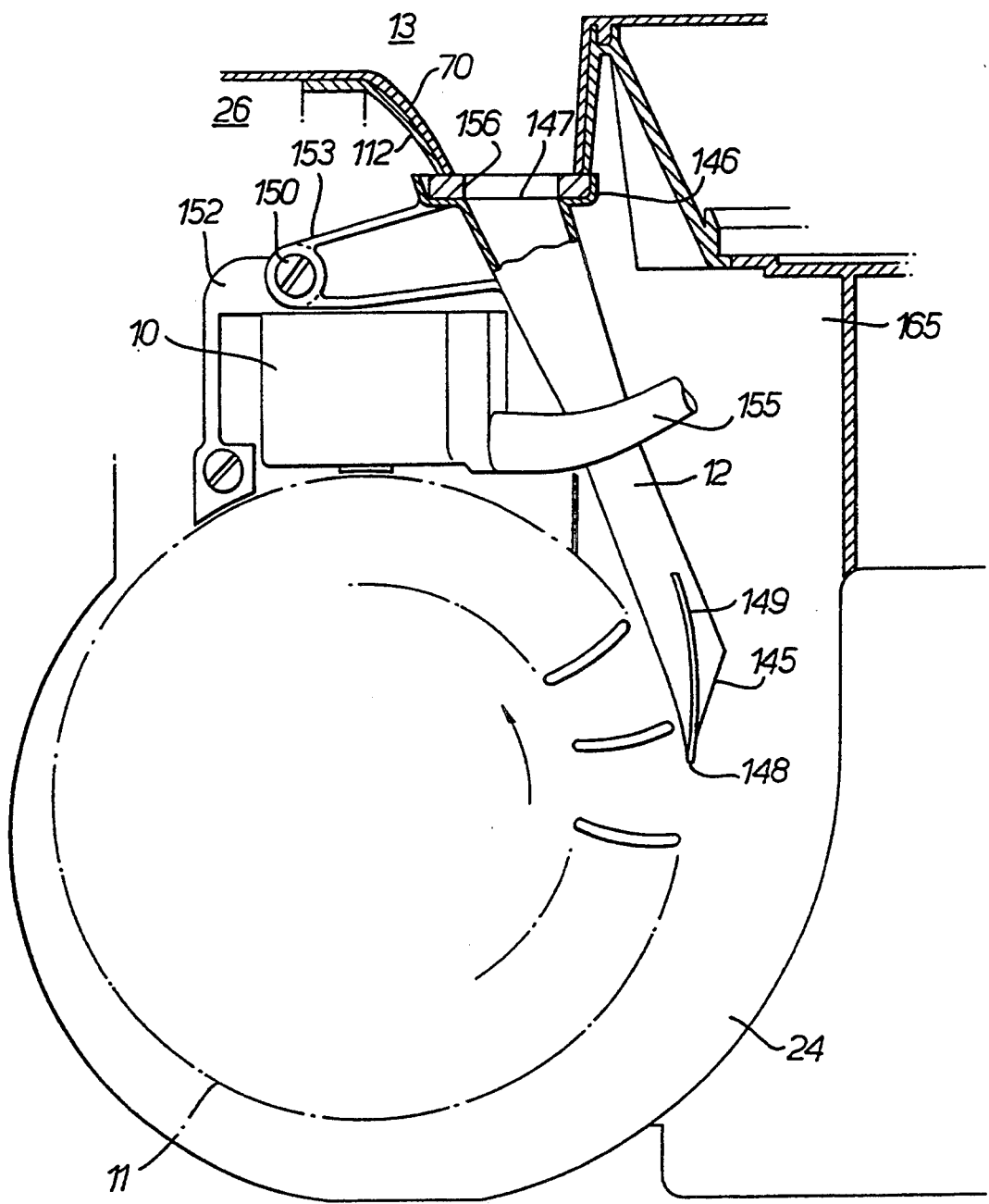
FIG. 5 shows a portion of the left hand side of the illustrated power unit, with starter casing, cooling air conduit and other details removed for the sake of clarity.

As shown in FIGS. 2 and 5, in the power unit 1 there is a motor cylinder 6 for a two-stroke internal combustion engine having a spark plug 7, a muffler 8, a carburetor 9, an ignition module 10, a fly wheel 11 designed as an impeller in a manner known per se, and other conventional components such as a crank shaft, fuel tank, etc.

Integrated in the power unit 1 there is a system in accordance with the invention for cleaning intake air and silencing intake air noise. This system comprises a number of components connected in series. A first component comprises a nozzle (mouth piece) tube 12 which, as shown in FIG. 5, is mounted adjacent to the periphery of the fly wheel 11, i.e. very close to the outer edge of the fins of the fly wheel (which in a manner known is designed as a fan). A fan housing 24 is arranged around the fly wheel 11. The fan housing 24 is covered in a manner known by a screen, not shown. A cooling-air guide-way having an opening in line with the centre of the fly wheel 11 is provided, and outside of this cooling-air guide-way there is a fan cover 25 and a starter casing having grid openings for cooling and intake air. The fan blades of the fly wheel/impeller 11 force a cooling air flow, which contains dust, in a manner known out towards the periphery of the fan housing, the centrifuged cleaned intake air being sucked through the nozzle tube 12 close to the fly wheel/impeller 11. The nozzle tube 12 thus in combination with the fly wheel/impeller 11 and the fan housing 24 defines a centrifugal cleaner.

The cooling air, which contains the main part of the impurities, proceeds further up in the power unit as will be described below, while the air which has been cleaned in the centrifugal cleaner flows through the nozzle tube 12 to a pre-filter chamber 13 which lies generally horizontal and takes up substantially the whole volume of the top of the power unit 1.

In the pre-filter chamber 13 there is an expansion and distribution space 14 for the air which is flowing in through the tube 12. Over the expansion and distribution space 14 a pre-filter 15 extends over substantially the whole length and breadth of the pre-filter chamber, and over the pre-filter 15 is a closed hood space 16, which also extends over substantially the entire length and breadth of the pre-filter chamber and hence also of the top of the power unit. From the closed hood space 16, a passage 17 leads downwardly to a main filter chamber 18 located under the pre-filter chamber 13. The main filter chamber contains a main filter 19. Also in the main filter chamber 18 there is an expansion and distribution space, generally designated 20, and a closed exit space 21. The exit space 21 has an outlet opening 22 connected to a manifold 23, which in its turn is connected to the carburettor 9.

The above briefly mentioned components will now be described in greater detail.

Figure 4:
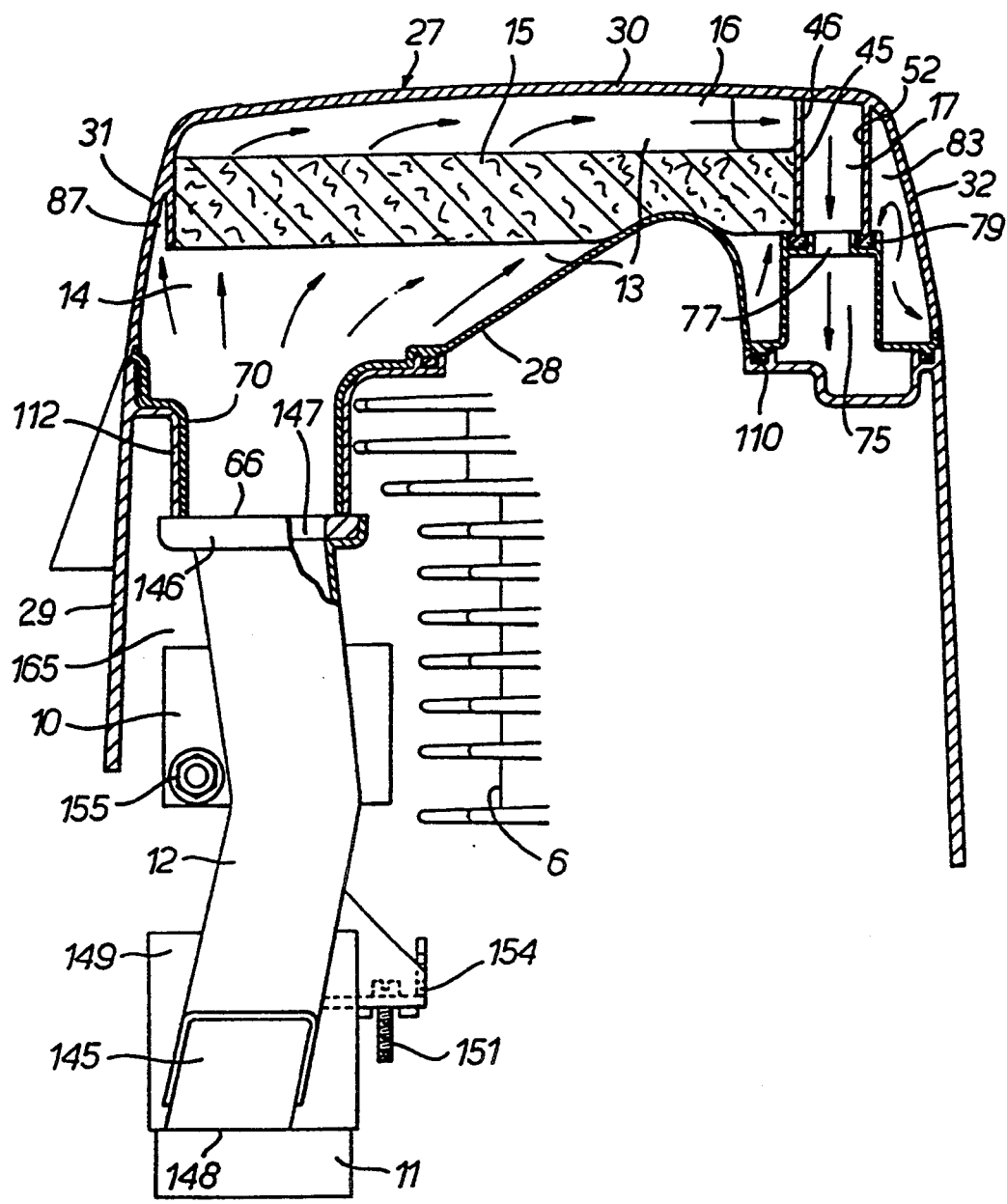
FIG. 4 is a partly schematic cross-section through components of an air cleaning system of the illustrated power unit illustrating the flow path of intake air through the unit.
Figure 6:
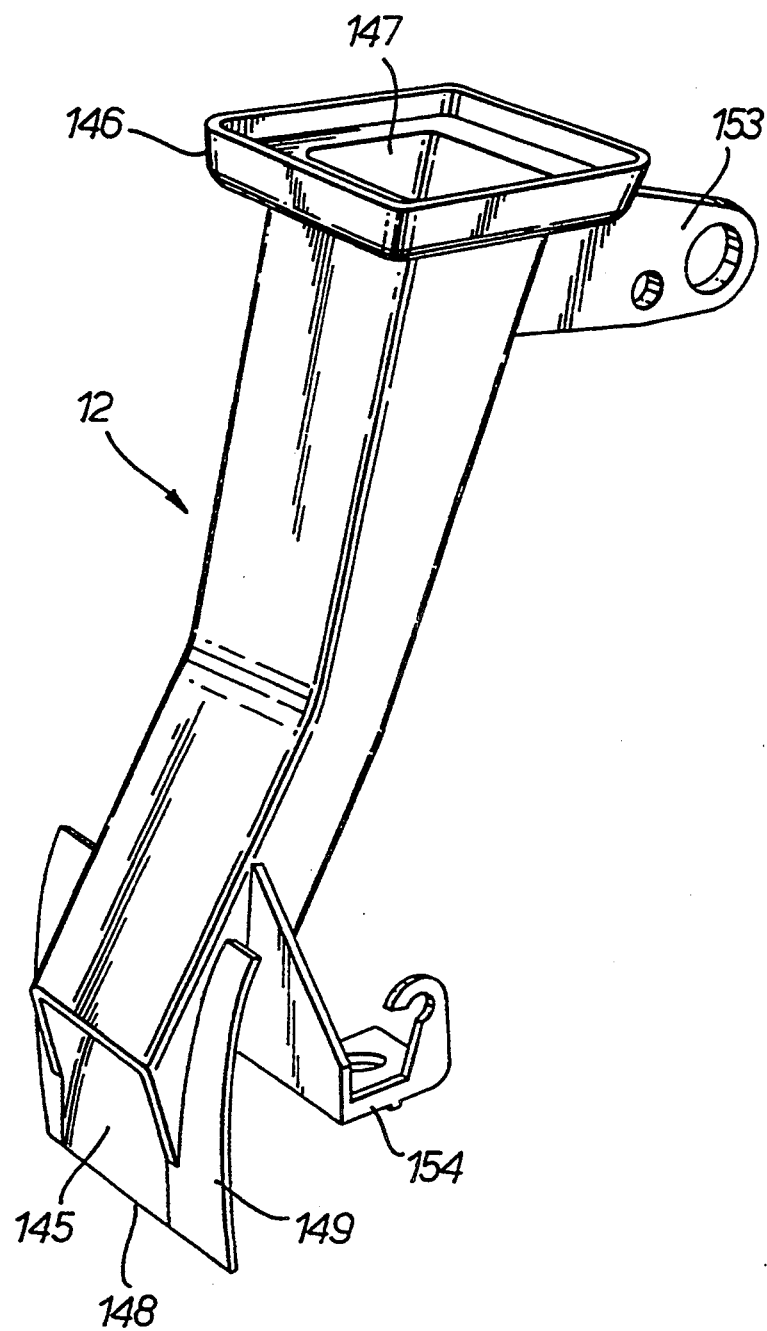
FIG. 6 is a perspective view of a nozzle tube for cleaned intake air of the illustrated power unit.

As shown in FIGS. 4 to 6, the nozzle (mouth piece) tube 12 is rectangular in cross-section. As viewed towards its short side, it is completely straight, but as viewed towards its broader side it is slightly bent in order to give space for a spark plug cable 155 from an ignition module 10. At its base it is cut obliquely, showing a port 145 for sucking in intake air and at its top there is a collar 146 surrounding an outlet opening 147. In the lowermost part, the lower edge of port 145 forms a lip 148 which coincides with the lower edge of a shield 149 extending laterally out from the two short sides of the nozzle tube 12. The shield 149 has a breadth corresponding to the breadth of the fan housing 24.

The nozzle tube 12 is fixedly mounted by an upper screw 150 and a lower screw 151 to a projection 152 of the motor cylinder 6 and to the crankcase, not shown, respectively. For this purpose there is an upper, strongly designed mounting lug 153 and a lower, smaller mounting bracket 154. By means of these fastening members 150, 151, 153 and 154 the nozzle tube 12 can be mounted very firmly to basic parts of the machine (also the collar 146 to some degree coacts to achieve this effect) so that the lip 148 can be positioned accurately very close to the outer edge of the fly wheel 11, and so that the shield 149 will extend generally tangentially to the fly wheel in the vicinity of the lip 148. The plane of the port 145 forms an acute angle to the shield and to said tangent, and the nozzle tube 12 extends obliquely forwardly and upwardly forming a direct connection to the pre-filter chamber 13. More particularly, the nozzle tube 12 extends upwardly immediately at the rear of the ignition module 10, which contains ignition coil, ignition electronics, etc. An ignition cable 155 extends to the side of the tube 12 in the region of the "knee" thereof, whereafter the cable proceeds to the spark plug 7. Because of this location and design, the obstructive action of the nozzle tube 12 upon the cooling air flow will be minimal.

The pre-filter chamber 13 and the main filter chamber 18 thus are formed by just three components, namely a filter cover 27, a pre-filter Chamber floor 28-referred to hereinafter for the sake of simplicity as the filter bottom 28-which also defines the roof of the main filter chamber 18, and a cylinder cover 29.

The filter cover 27 has a slightly arcuate roof 30; left and right side walls 31, 32 respectively, which slope downwardly and outwardly; a front wall 33 which slopes downwardly and forwardly; and a rear wall 34 which slopes downwardly and rearwardly. As will be seen in FIG. 9 the lower edges of walls 31–34 lie in a common plane 35. The design of the edge portion in the region of the front wall 33 is shown in FIG. 10. A horizontal, circumferential abutment surface 36 extends from approximately the centre of the wall out to the exterior of the filter cover, and a circumferential, wedge-shaped lip 37 extends down to the plane 35. The inside of lip 37 is vertical, while its outer surface is inclined to the vertical plane.

Figure 7:
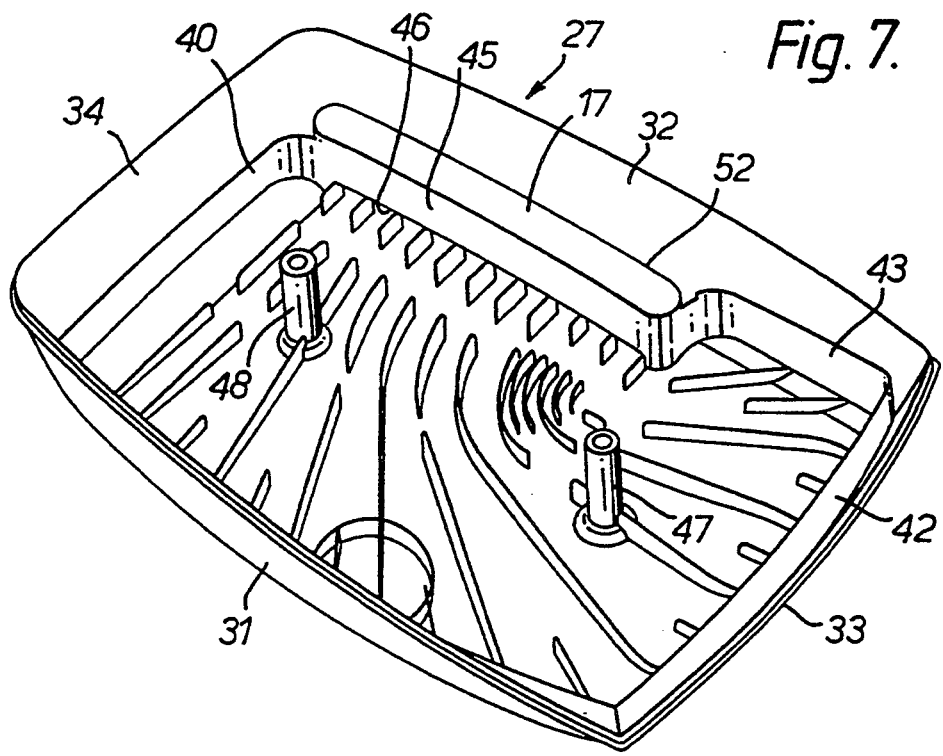
FIG. 7 is a perspective view of the interior of a filter cover of the power unit as viewed obliquely from below.

As shown in FIG. 7, in the filter cover 27 there is an inner frame 40 extending down from the roof 30 with a first portion 41 at a distance from the left side wall 31; with a second portion 42 at a distance from the front wall 33; with a third portion 43 at a distance from the right side wall 32; and with a fourth portion 44-from the transition between the floor 30 and the rear wall 34-at a distance from the rear wall. In the frame 40 there is included-between said third and fourth portions-also an inner wall 45 of the passage 17 between the closed hood space 16 of the pre-filter chamber 13 and the main filter chamber 18. The pre-filter 13 is a press fit in the frame 40 and is kept firmly in place by friction against the inside of frame 40. Moreover, a from 47 and a rear 48 tube extend vertically downwards from the roof 30, said tubes defining guides for mounting screws 47, 48. The tubes 115, 118 also act as pillars which support the roof 30. The tubes 47 and 48 extend through holes 49, 50 in the pre-filter body 15 which are somewhat narrower than the tubes 47, 48, thereby contributing to keeping the pre-filter 15 in the cover 27, if the cover is lifted up from the filter bottom 28.

Figure 25:
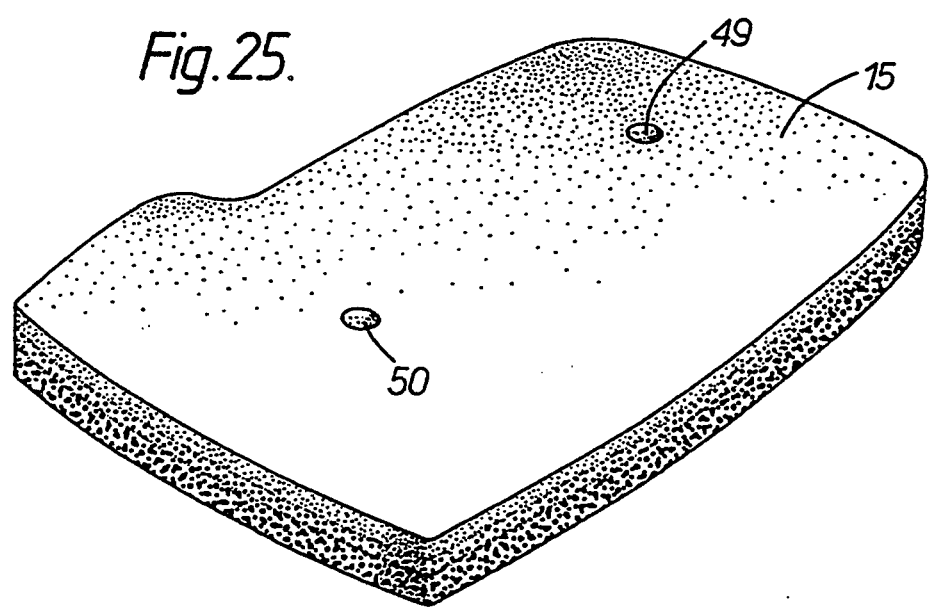
FIG. 25 is a perspective view of the illustrated pre-filter as viewed obliquely from above.

The pre-filter 15 is illustrated in FIG. 25 and comprises a flat disc of foamed plastics soaked with oil with three layers having different pore sizes, wherein the lowermost layer has largest pore sizes and the upper layer finest pore sizes. The outer contour is adapted to the shape of the frame 40 but is some millimeters longer and some millimeters broader, so that the pre-filter 15 can be forced up into and be kept in the frame 40 by a press fit.

The passage 17 from the closed hood space 16 of the pre-filter chamber 13 to the main filter chamber 18 is defined by said inner wall 45 and by an outer wall 52 at a distance from the fight hand side 32 of the filter cover and by a pair of bent end walls. The passage 17 is fully vertical in the flow direction of the air and has a length in the vertical direction corresponding to the thickness of the pre-filter 15 as counted from its inlet opening, as will be explained below. In the horizontal direction, however, the passage 17 has a considerable length between the two bent end walls and extends from a point adjacent to the rear wall 34 of the filter cover 27 forwards about two thirds of the entire length of the cover. Between the roof 30 and the inner wall 45 of passage 17 said inlet opening is provided, said inlet opening being a longitudinal opening 46 between the closed hood space 21 and the passage 17, said opening 46 extending along the entire length of wall 45.

Figure 8:
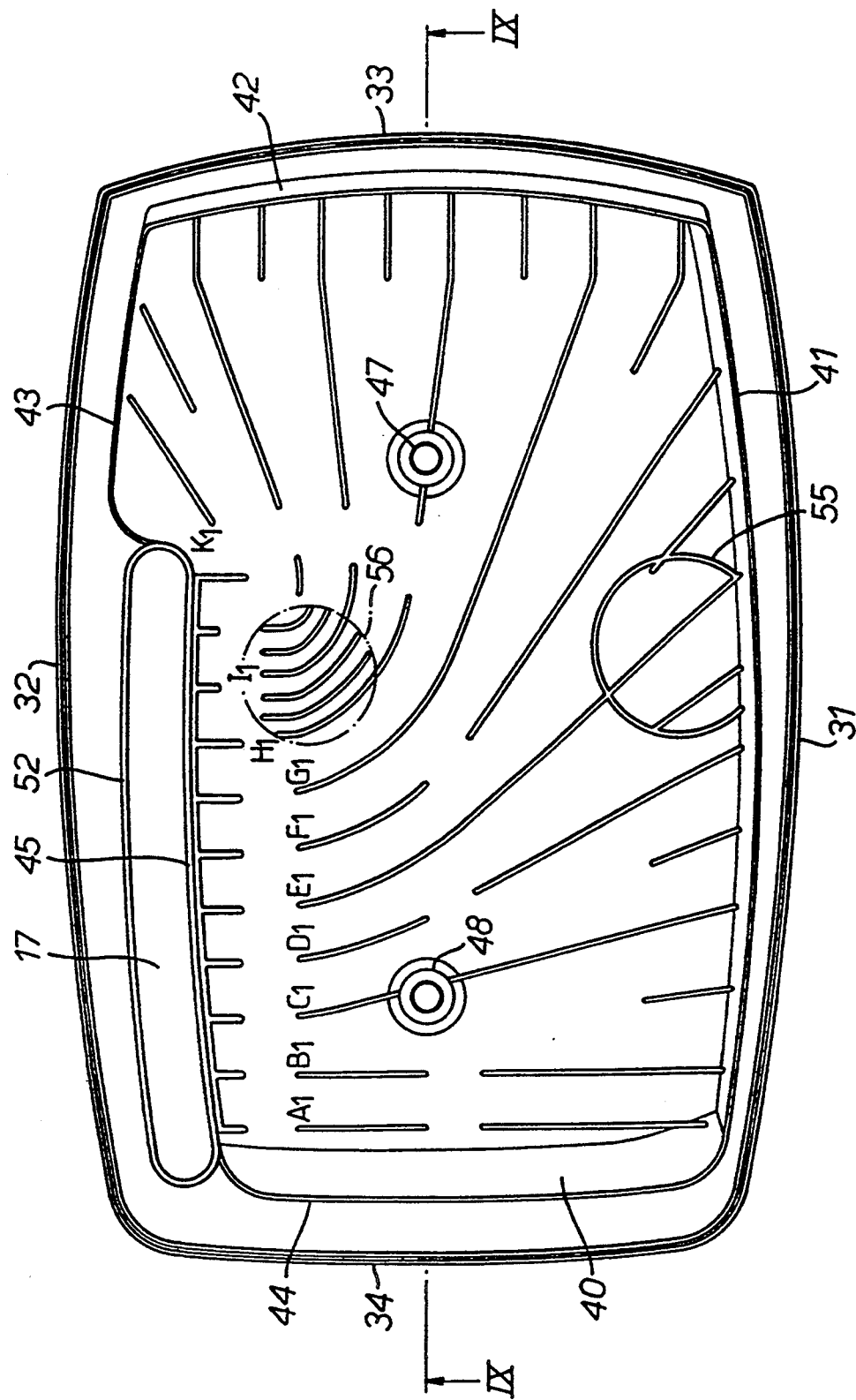
FIG. 8 is a plan view of the filter cover of FIG. 7 as viewed from below.
Figure 9:
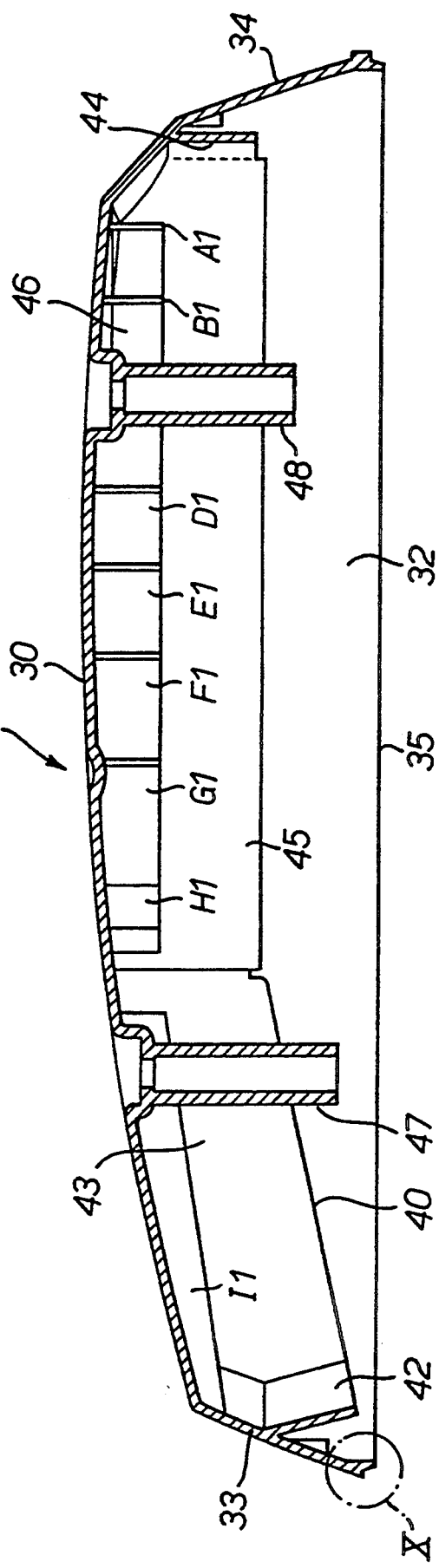
FIG. 9 is a longitudinal section taken along line IX—IX of FIG. 8 but with the roof of the filter cover turned upwards.
Figure 10:
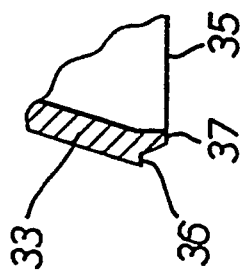
FIG. 10 shows the encircled edge portion X of FIG. 9 to an enlarged scale.
Figure 11:
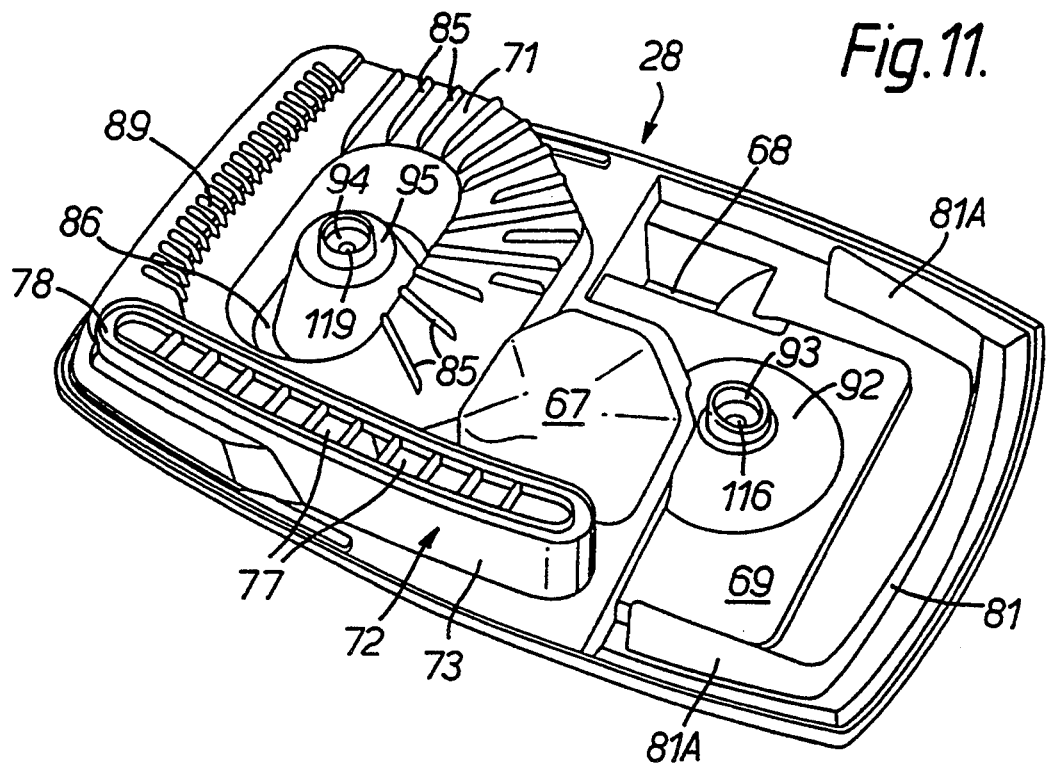
FIG. 11 is a perspective view of the upper side of the chamber floor of a pre-filter of the illustrated power unit.
Figure 13:
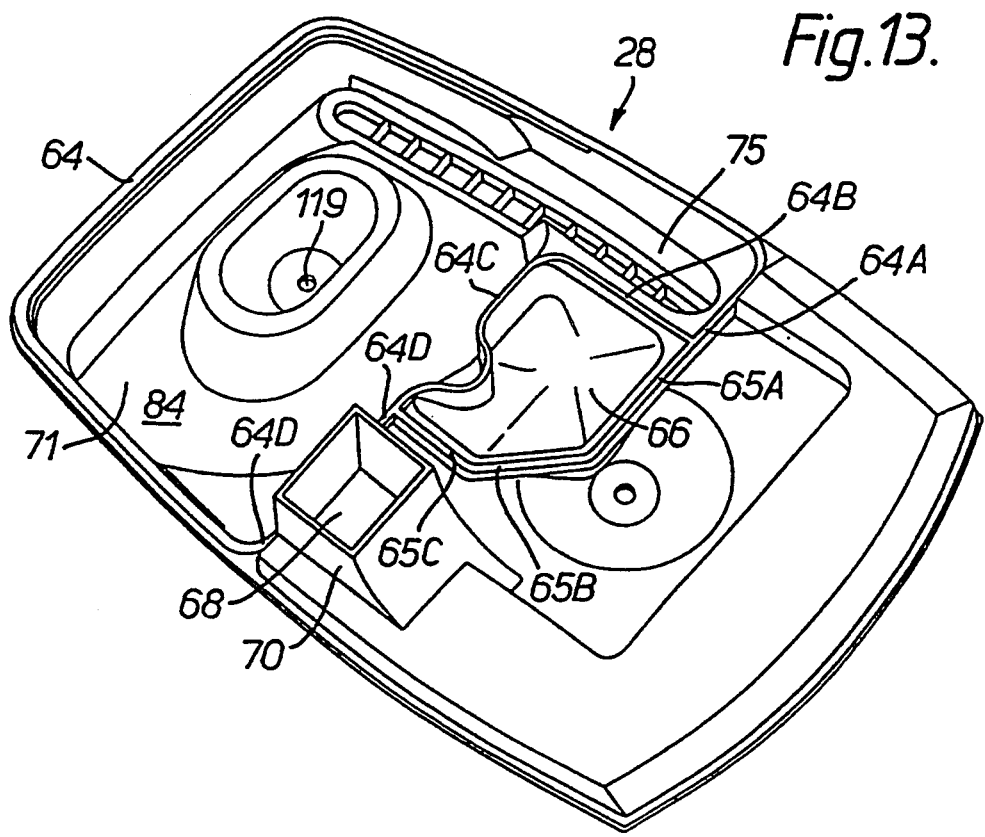
FIG. 13 is a perspective view of the underside of the pre-filter chamber floor of FIGS. 11 and 12.
Figure 15:
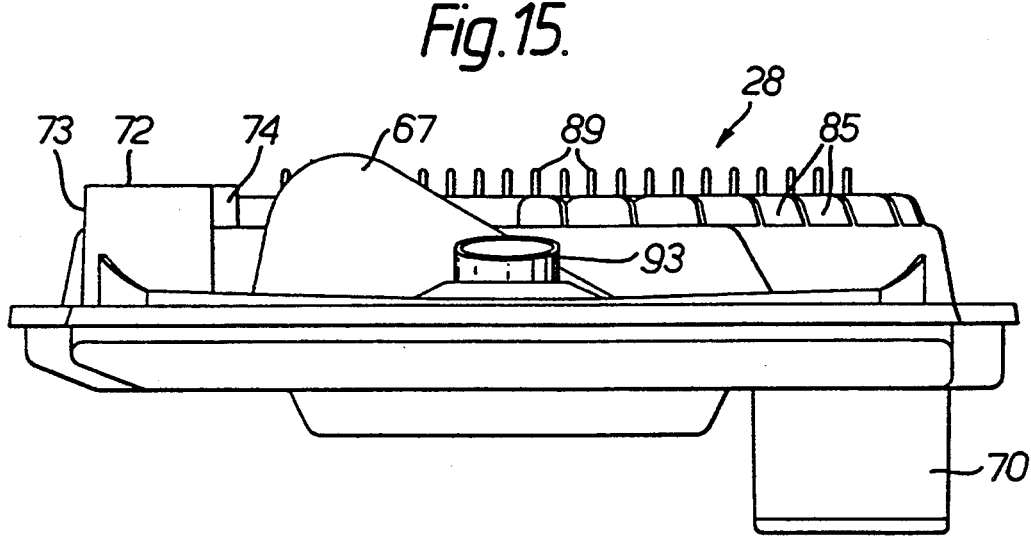
FIG. 15 is a front view taken along line XV—XV of FIG. 14.
Figure 16:
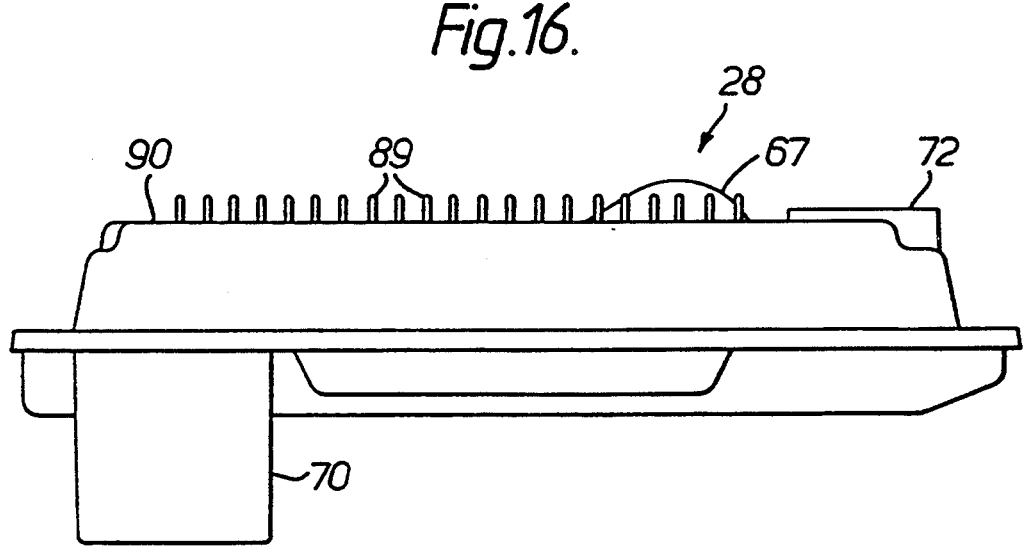
FIG. 16 is a view from the rear taken along line XVI—XVI of FIG. 14.
Figure 20:
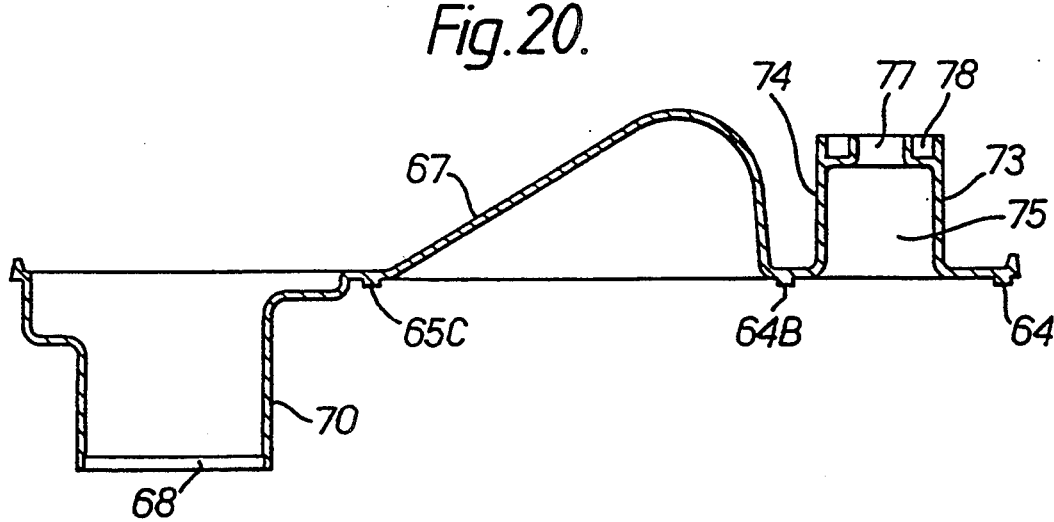
FIG. 20 shows the contour of the illustrated pre-filter chamber floor in section taken along line XX—XX of FIG. 19.
Figure 21:
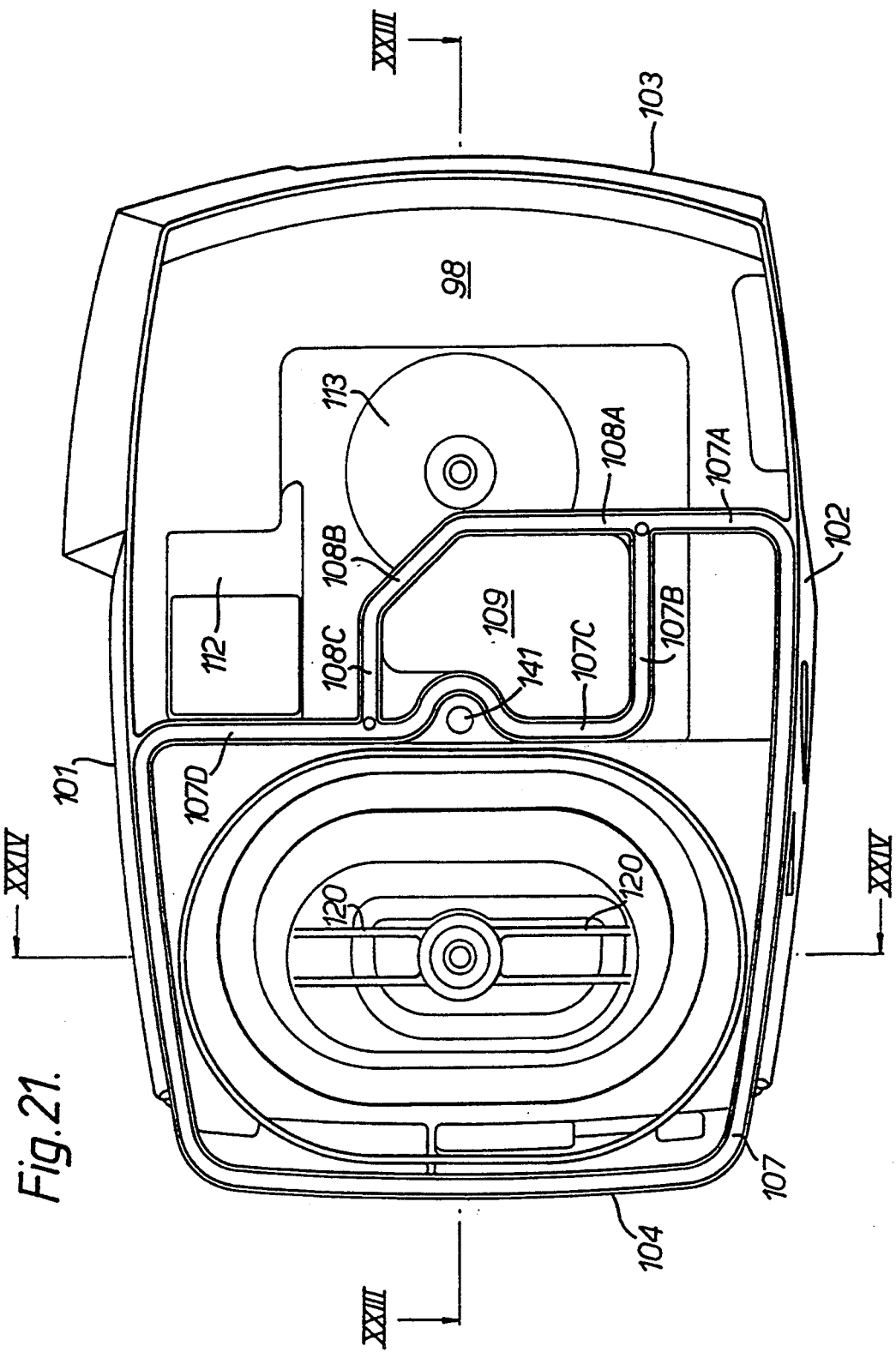
FIG. 21 shows the cylinder cover from above.
Figure 22:
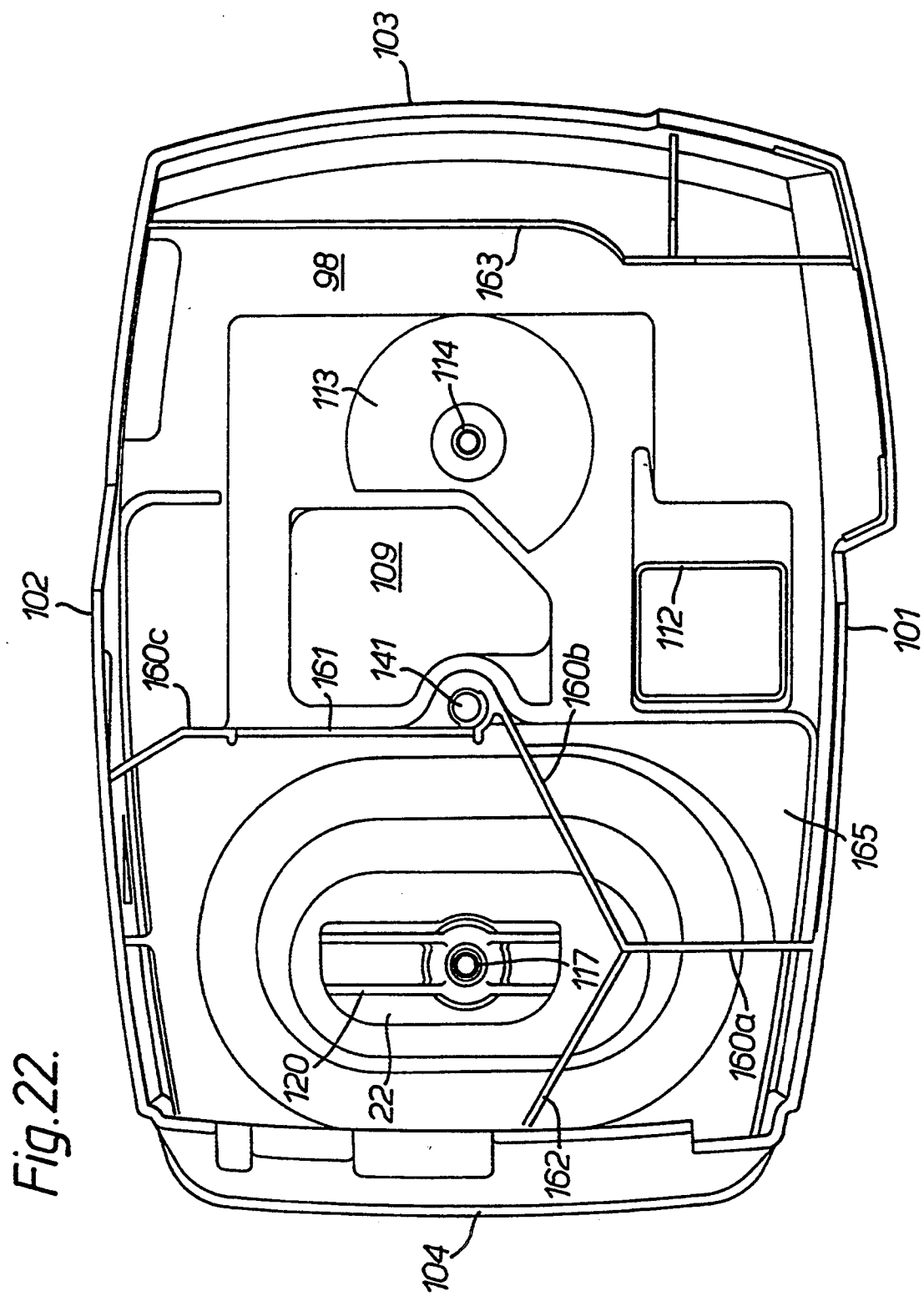
FIG. 22 shows the cylinder cover of FIG. 21 from below.
Figure 23:
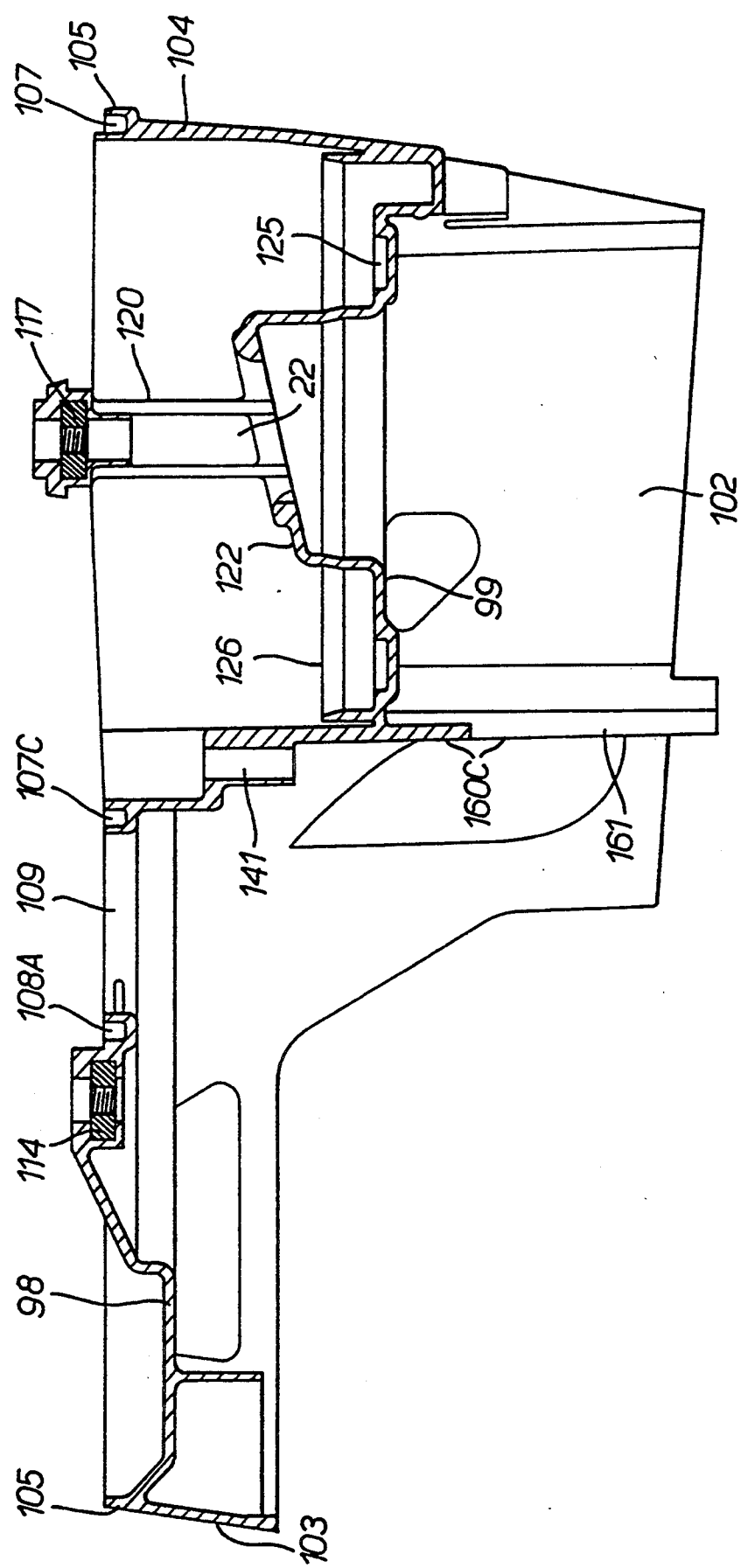
FIG. 23 is a longitudinal section of the cylinder cover of FIGS. 21 and 22 taken along line XXIII—XXIII of FIG. 21.
Figure 24:
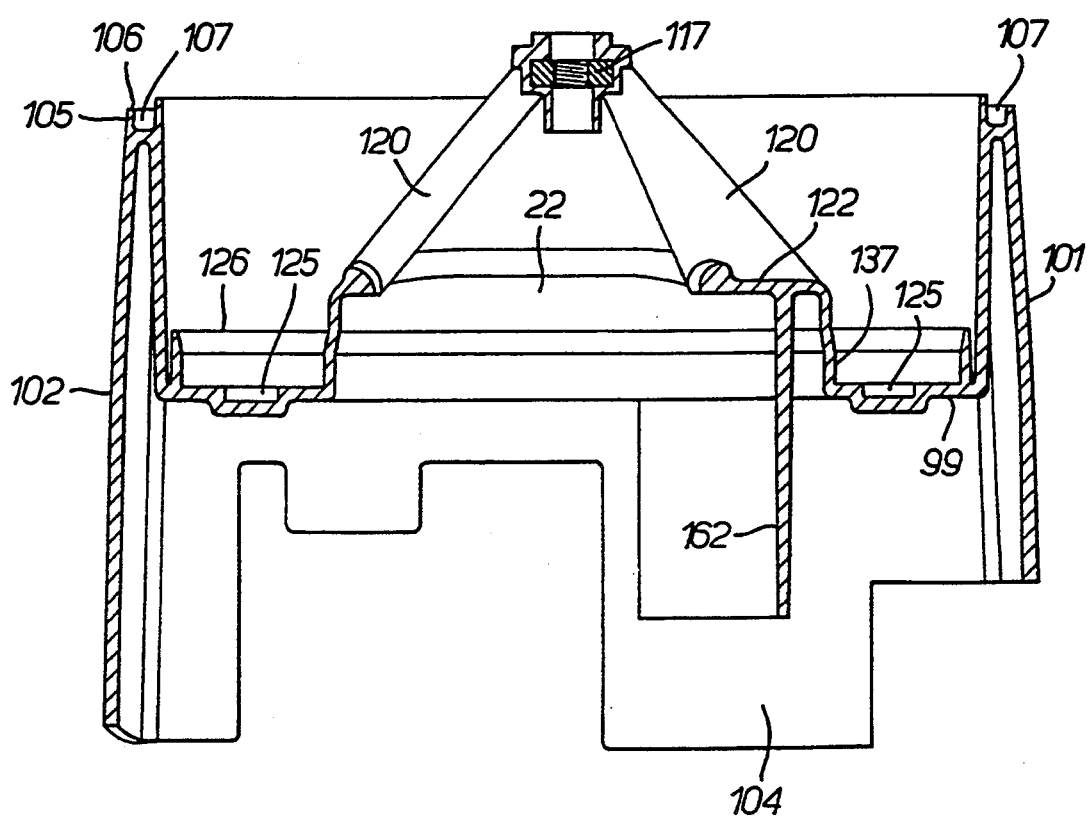
FIG. 24 is a cross section taken along line XIV—XIV of FIG. 21.

In the closed hood space 16 between the roof 30 and the pre-filter 15 there are provided, as will be seen from FIGS. 8 and 9, a large number of fins A1, B1, C1 . . . K1 which extend vertically downwards from roof 30 to contact the upper surface of filter 15 and to form channels which extend between the roof and the pre-filter. These fins have multi purposes; to function as spacer means to prevent the filter 15 from being pressed all the way up to roof 30; to guide the air from all parts of the closed hood space 16 through said channels towards the inlet opening 46 to passage 17; and to stiffen the roof 30. Air is guided in the closed hood space 16 so that it is withdrawn comparatively evenly from all parts of the closed hood space, i.e. such that approximately equal amounts of air flow in each channel between adjacent fins towards the inlet opening 46. In order to approximately achieve this effect, the first fins A1, B 1 extend transversely over the closed hood space 16, while the subsequent fins C1, D1, F1 extend from the left side of frame portion 41 in the shape of an are and converge towards the opening 46, while the subsequent fins G1-J1 follow a bent pathway from the from frame portion 42 towards the opening 46. From the right hand frame portion 43 there extends a pair of shorter fin portions, including the fin K1. Close to the frame portions 41, 42 and 43 there are also intermediate, shorter fin portions. As is best shown in FIG. 8 there are also openings in some of the fins, which permit the air to be distributed between the channels in order further to promote an even withdrawal of the air from the closed hood space 16. Reference numeral 55 designates a ring which extends down from the roof 30 to the filter 15 in order to shield that area on the underside of filter 15 where the air is flowing into the filter chamber. Further, there is a circular area 56 in which there is an additional number of fins which stiffen the roof 30 in the area above the spark plug 7 for reasons which will be described below.

The filter bottom 28 now will be described with reference to FIGS. 11-20. The outer contour of the filter bottom 28 corresponds to the outer contour of the filter cover 27 projected on the plane 35. The design of the rim portion 60 in those parts which surround the main filter chamber 18 is shown in FIG. 18, while the design of the rim portion 61 in the other parts of the circumference of the filter bottom is shown in FIG. 19. It is a common feature of the portions 60 and 61 that they have a wedge-shaped lip 62, which extends upwardly outside the downwardly directed lip 37 on the filter cover 27, so that the upper circumferential edge of lip 62 will abut circumferentially against the circumferential abutment surface 36 of the filter cover, when the filter cover 27 and the filter bottom 28 are brought together in the manner illustrated in FIGS. 29 and 30. Further, under the wedge-shaped lip 62, there is a circumferential, horizontal abutment surface 63. In the rim portion 60, in the region of the main filter chamber 18 there is moreover a rounded flange 64 on the underside of the filter bottom. The flange 64 on the underside of the filter bottom together with flange portions, as shown in FIG. 13, 64A, 64B, 64C, and 64D, which are in plane with flange 64, form a circumferential leakage preventing sealing flange for the main filter chamber 18. Further, flange portions 65A, 65B and 65C, which also are in plane with the flange portions 64, 64A-64D, together with the flange portions 64 B and 64C, form a circumferential sealing flange for a space 66 for the spark plug 7 under a raised cupola 67 in the filter bottom 28. The cupola 67 is provided under the ring-shaped area 56 in the filter cover where the fins are arranged more densely in order to prevent the pre-filter from being pressed up against the filter cover because of the pressure from the spark plug cupola 67.

The filter bottom 28 can be divided into three integrated main parts, namely a first part comprising a downwardly directed, tapered connection piece 70 having an outlet opening 68 connected to the nozzle tube 12, which extends from the centrifugal cleaner and said cupola 67 for the spark plug space 66; a rear pan forming a roof 71 over the main filter chamber 18; and an elevated part 72 which matches the passage 17 in the filter cover and which extends up to the passage 17 in the filter cover 27 at a small distance from the rear side wall 32 of said filter cover. The elevation 72 is formed by an outer, longitudinal wall 72 and, in the from part of the elevation, by an inner longitudinal wall 74 outside of the cupola 67, and by end walls which have not been given reference numerals. Inside the elevation 72, i.e. between the said walls 73 and 74 and the end walls, there is formed a foremost space 75, which is a continuation of the passage 17 and is also a part of the main filter chamber, more particularly it is a part of the distribution space 20 for intake air in the main filter chamber 18. On top there is a series of openings 77, which communicate with the passage 17. Around the longitudinal series of openings 77 there is a circumferential groove 78 in the upper surface of the filter bottom, said groove accommodating a rubber seal 79, as shown in FIG. 4. The lower, circumferential edge of those walls 45, 52 and of the rounded ends, respectively, which form the passage 17 in the filter cover 27, extends down into the groove 78, sealingly pressing against the rubber seal 79.

On the upper side of the front part 69 of the filter bottom 28 there is a fin 81 which extends vertically upwards from the filter bottom at a distance from the front edge. The distance is sufficiently large in order that the upper edge of the fin 81 in the said region will be located somewhat at the rear of the front frame portion 42 in the filter cover 27, so that the fin 81 can support the pre-filter 15 by contacting its underside. The fin 81 further extends rearwardly a distance from the side walls 31, 32 of the cover 27 with portions 81A, when the cover 27 and the filter bottom 28 are connected to each other. The spaces inside 82A and outside 82B the fin 81, 81A in the front part 69 of the filter bottom are included in the expansion and distribution space 14 and contribute to the distribution of the intake air in the said expansion and distribution space 14 between the filter bottom 28 and the pre-filter 15.

Figure 3:
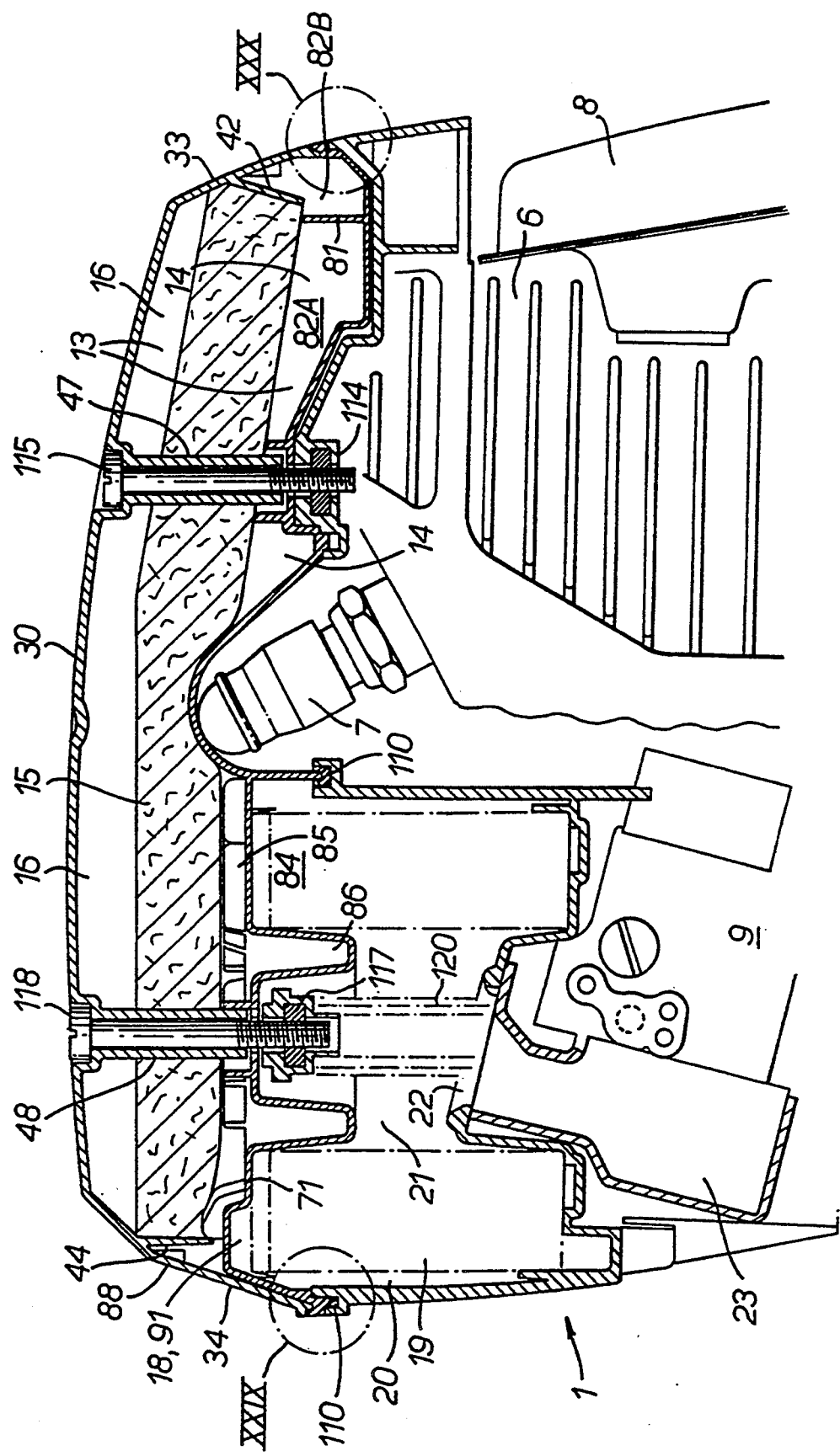
FIG. 3 is a side elevation in section of the upper parts of the power unit illustrated in FIG. 2, comprising a pre-filter and a main filter.

As will be seen from FIG. 3, the upper part 84 of the main filter chamber 18, including a rear air distribution space 91, is formed by elevated portions of the rear part of the filter bottom 28, said elevated portions also defining the roof 71 of the main filter chamber. Within the region of these elevated portions, the expansion and distribution space 14 in the pre-filter chamber 13 is substantially lower (narrower) than in the front part of the pre-filter chamber. Therefore, spacer means in the form of fins 85 are provided on the roof 71. Further, within the elevated roof portion 71, there is an oval, circumferential trench-shaped depression 86 in the filter bottom. This trench 86 forms a receipt and distribution space for air which flows in through the channels which are formed between the fins 85 and which are directed from the front part of the expansion and distribution space 14 towards the trench 86. Further, the trench 86 in the filter bottom, on the opposite side thereof, i.e. in the main filter chamber 18, functions as a guide and clamping means for the main filter 19 provided in the main filter chamber 18. Further, as can be seen from FIG. 4, air can flow in the space 83 between the right hand side wall 32 of the filter cover and the passage 17 and in the space 87 between the left hand side wall 31 of the filter cover on one side and the frame portion 41 and the left hand side wall of the upper part 84 of the main filter chamber (not shown in FIG. 4) on the other side, and in the space 88 between the rear wall 34 of the filter cover and the rear frame portion 44. From this rear space 88 the air can flow over an additional elevated transversal portion 90 adjacent to the rear wall of the filter cover, between a large number of rear fins 89 which support the pre-filter within this additional elevated portion 90 forwards against the distribution space in the trench-shaped depression 86.

In the front part 69 of the filter bottom 28 there is a conical elevation 92, in the top of which there is a seat 93 for the front tube/pillar 47. In the corresponding way, in the rear part of the filter bottom, there is a seat 94 provided in the centre of an elevation 95 within the trench 86 for the rear tube/pillar 48.

Figure 29:
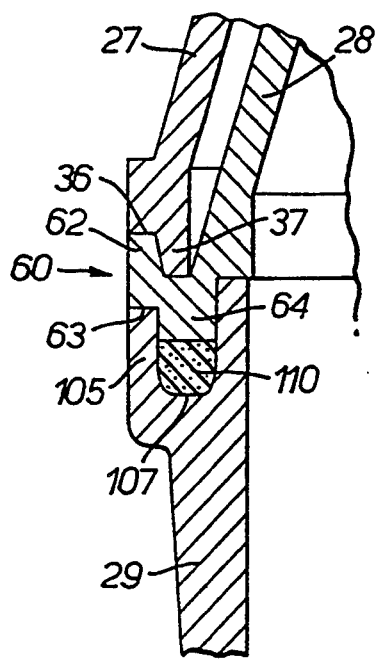
FIG. 29 shows the encircled portion XXIX of FIG. 2 to an enlarged scale.
Figure 30:
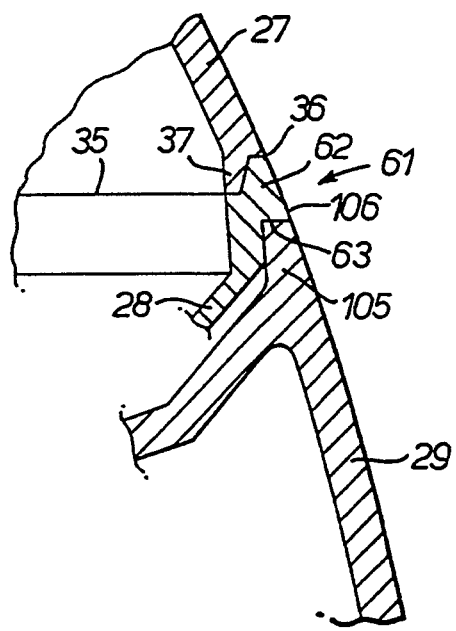
FIG. 30 shows the encircled portion XXX of FIG. 2 to an enlarged scale.

As will be seen from FIGS. 21 to 24, the cylinder cover 29 has a from part comprising a front roof portion 98 whose contour in cross-section essentially corresponds to the contour of the front portion 69 of the filter bottom, which rests against said front roof portion 98; and a rear portion which forms a main filter chamber floor 99. The sides comprise a left-hand side wall 101, a right-hand side wall 102, a from wall 103, and a rear wall 104. Around its entire circumference, the walls 101–104 exhibit an upright lip 105, the upper edge 106 of which defines a plane and abuts the lower abutment surface 63 of the rim portion 60, 61 of the filter bottom, so that said rim portion can be clamped between the filter cover 27 and the cylinder cover 29 as illustrated in FIGS. 29 and 30.

Inside the lip 105 there is a further groove 107 in the region of the rear wall 104 and those parts of the left-hand side wall 101 and the right-hand side wall 102, which surround the main filter chamber 18. This groove continues around the main filter chamber with portions 107A, 107B, 107C, and 107D corresponding to the portions 64A, 64B, 64C and 64D, respectively, of the sealing flange on the underside of the filter bottom 28. Further, groove portions 108A, 108B, and 108C are provided to cooperate with the portions 65A, 65B, and 65C of the sealing flange on the underside of the filter bottom in order-together with groove portions 107B and 107C-to surround an opening 109 for the spark plug 7. In the grooves 107A–D, 108A–C, there is accommodated a rubber string 110 against which the sealing flanges or sealing flange portions 64, 64A–D, and 65A–C on the underside of the filter bottom are provided to press sealingly in the assembled unit. At a smaller distance from its left-hand side wall 101, the front roof portion 98 of the cylinder cover has a downwardly directed connection piece 112, defining a female member matching the connection piece 70 of the filter bottom, which as a male member is brought down with sealing fit in the female connection piece 112 of the cylinder cover. The lower edges of the two connection pieces 70, 112 lie in the same plane and are sealingly pressed towards the seal 156 in the upper collar 146 of the nozzle tube 12, so that a tight connection is created between the nozzle tube 12 and the pre-filter chamber 13.

In the from part 98 as in the filter bottom there is a conical elevation 113. At the top of this elevation a nut 114 is secured in the plastics casting. (The filter cover, the filter bottom as well as the cylinder cover are made of plastic.) A front screw 115 is screwed into this nut 114 in the assembled unit as shown in FIG. 3.

Also in the rear pan of the filter cover there is a nut 117 for a rear screw 118 in the nut tube/pillar 48, said screw extending through a hole 119 in the centre of the elevated portion 95. The nut 117 is secured in the plastic casting at the top of a pair of struts 120, which extend upwards from a sloping, elevated centre portion 122 of the rear part 99 of the cylinder cover. In the sloping portion 122, also the outlet opening 22 is provided, forming a connection to the manifold 23 as shown in FIG. 3.

In the bottom of the main filter chamber 18 there is a groove 125, which is provided around the elevated centre portion 122, said groove 125 being displaced forwards relative to the centre portion 122. A frame, which is a guide and sealing member for the main filter 19, has been designated 126.

The cylinder cover 29 is fastened to the body of the power unit 1 by means of a screw (not shown), which extends through a screw hole 141.

Inside the walls the underside of the cylinder cover follows the contour of the upper side of the above described front and rear parts 98, 99 of the cylinder cover with the following exceptions. A partition wall, generally designated 160, extends vertically downwardly from the bottom of the main filter chamber 18. This partition wall 160 consists of a first, rear section 160a, which goes from the left-hand wall 101 in a direction towards the outlet opening 22 of the main filter chamber 18 but not quite the whole way to the said opening, whereafter the second section 160b of the partition wall 160 proceeds obliquely forwardly towards the centre of the cylinder cover in the region of the screw hole 141. Between this point and the right-hand wall 102 of the cylinder cover there is a third section 160c of the partition wall, which has a recess 161 for intake air and for the carburetor. Further, there is a rear stiffening fin 162 and a front fin 163.

The partition wall 160 forms a rear limitation of the motor room, which houses the motor cylinder 6. A rear part or pre-chamber 165 to the motor room 26 is restricted by the left-hand side wall 101 of the cylinder cover and of the sections 160a and 160b of the partition wall 160.

Figure 26:
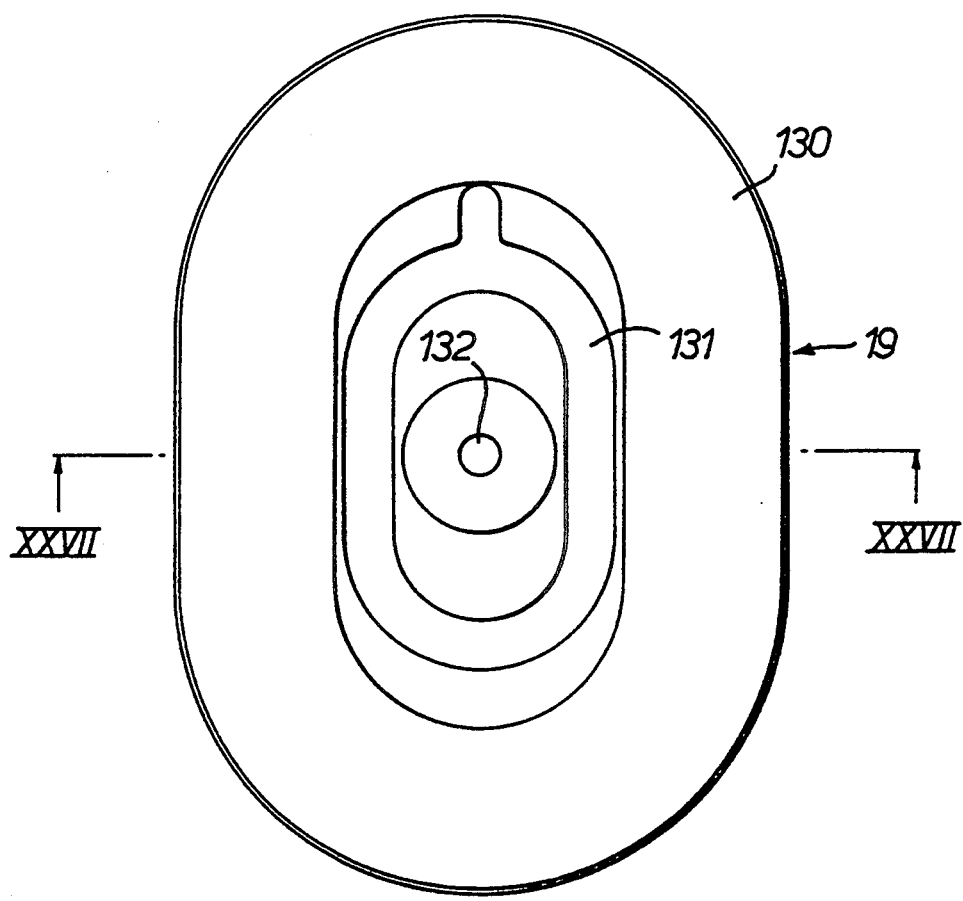
FIG. 26 is a plan view of a main filter of the illustrated power unit.
Figure 27:
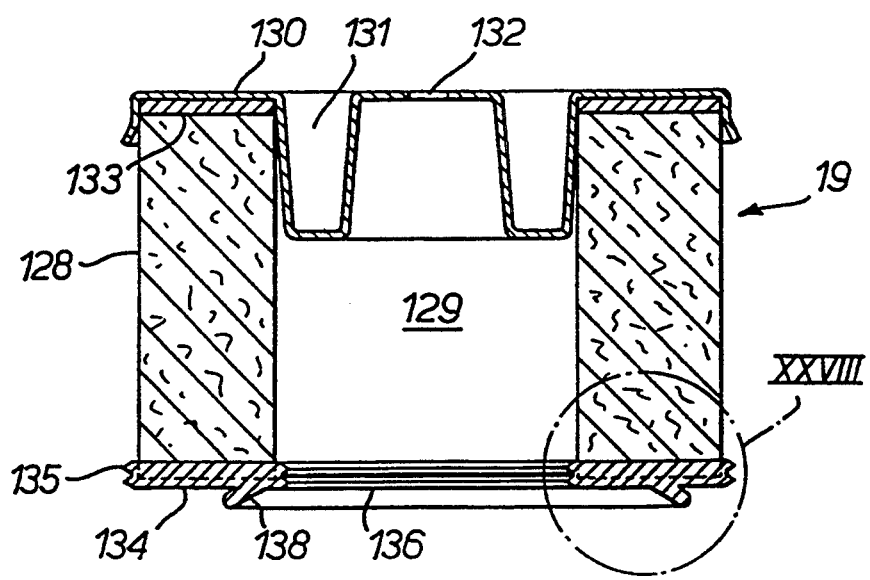
FIG. 27 shows the main filter of FIG. 26 in a cross-section taken along line XXVII—XXVII of FIG. 26.
Figure 28:
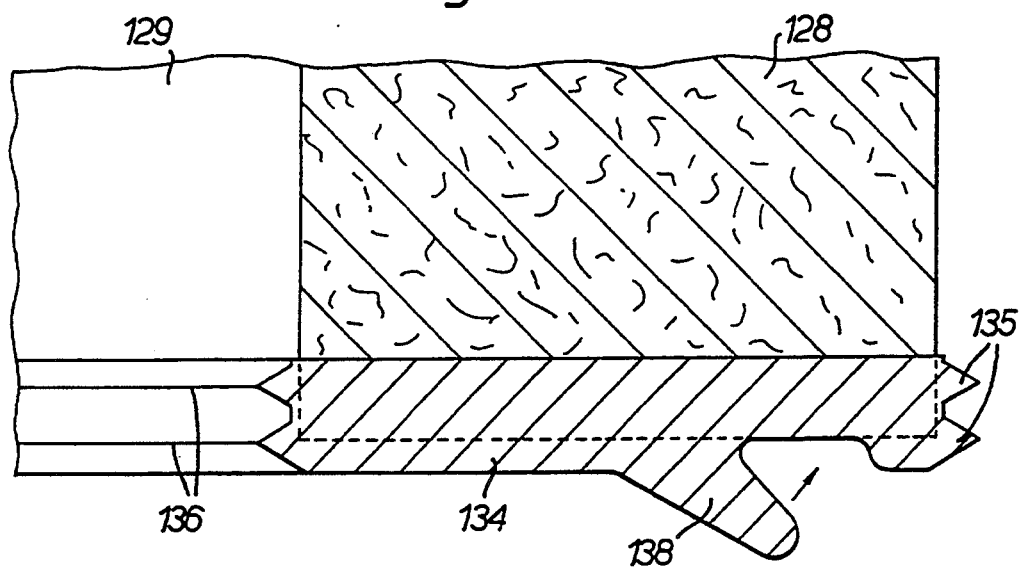
FIG. 28 shows the encircled portion XXVIII of FIG. 27 to an enlarged scale.

The main filter 19 will now be described with reference to FIGS. 26–28. As illustrated, it comprises a paper filter of a type, the principle of which is known, but whose design has been adapted to the filter system according to the invention. The filtration part is made of filter paper which has been folded to the shape of an oval, upraised cylinder 128 having a hollow centre 129. A filter cover 130 made of stiff plastics material covers the filter cylinder 128 and the hollow space 129. An oval trench-shaped depression 131 extends down in the hollow space 129 matching the oval trench-shaped depression 86 in the filter bottom 28. A hole 132 for the screw 118 is provided in the centre. A seal 133 is placed between filter cover 130 and filter cylinder 128. A sealing ring 134 of soft PVC is provided under the filter cylinder 128. The sealing ring 134 has two outwardly directed, pointed projections 135, which sealingly press against the inner side of the frame 126 when the filter is assembled, and on the inner side two inwardly directed, pointed projections 136 sealingly engage the vertical wall 137, which extends up in the hollow space 129. Further, on the underside, a lip 138 extends downwardly and outwardly, sealingly engaging the bottom of the groove 125.

To sum up, the filter system comprises a centrifugal cleaner which includes an impeller (the fly wheel) 11 and a nozzle tube 12, a pre-filter 15, and a main filter 19. The nozzle tube 12, the pre-filter 15 and the main filter 19 are connected in series. The pre-filter chamber 13 and the main filter chamber 18 are formed by the filter cover 27, the pre-filter chamber floor (filter bottom) 28, and the cylinder cover 29 as an integrated unit, which can readily be kept together, the filter bottom 28 with its rim portion 60, 61 being circumferentially clamped between the filter cover 27 and the cylinder cover 29 on assembly. In the assembled unit, the filter cover 27 and the filter bottom 28, including the pre-filter chamber 13 between the filter cover 27 and the filter bottom 28, in their turn form a unit which can be lifted as one unit from the cylinder cover 29 after the screws 115 and 118 have been unscrewed. If the pre-filter 15 and the pre-filter chamber 13 are to be cleaned, the cover 27 is dismantled from the filter bottom 28. The filter bottom then can be emptied/cleaned of those impurities which have fallen down on the filter bottom 28 from the pre-filter 15. The pre-filter 15, which is mounted with press fitting in the filter cover 27, during this operation is kept in the filter cover but can, if necessary, readily be removed from the filter cover 27 for cleaning, oiling, or change, whereupon said components can be re-assembled. Due to the fact that the filter bottom 28 is included as a component in a unit in which the various components can be kept together so that they really can be handled as a one piece unit consisting of the filter cover 27, the pre-filter 15 and the filter bottom 28, there is no risk that dirt will fall down into the main filter chamber 18 or onto the spark plug 7. Due to the fact that the filter cover 27 and the filter bottom 28 can be removed as an integrated unit, the main filter 19 also will be readily available for change or cleaning as well as the spark plug 7.

Due to the fact that the inlet to the pre-filter chamber 13 is designed as a downwardly directed connection 70, which as a male member is inserted into a matching connection piece 112 in the cylinder cover, at the same time as the nozzle tube 12, which forms part of the centrifugal cleaner, is sealingly pressed against the connection piece 112 on the cylinder cover, a tight connection between the nozzle tube 12 and the pre-filter chamber 13 is automatically achieved when the filter cover 27 and the filter bottom 28 as a unit is mounted by screw coupling to the cylinder cover 29.

By the integration according to the invention of the pre-filter chamber and the main filter chamber to form an assembled unit with the filter bottom clamped between the two first mentioned members, it has also been possible to design the top of the power unit to have an aesthetically appealing appearance. The slightly arcuate shape without any sharp transitions or edges also is of practical importance, not the least from an ergonomic point of view.

The function of the above described system now will be explained. By means of the fan with impeller (fly wheel) 11 air is sucked in through the grid in the fan cover 25 in a manner known. The cooling air, which contains the main part of grinding dust and other solid impurities sucked in by the fan, is forced out towards the periphery of the fan housing 24 and is blown up into the pre-chamber 165 of the motor room 26. From there, the cooling air flows forwardly on each side of the nozzle tube 12, which is located at the rear of the ignition module 10, into the main part of the motor room 26. The cooling air thereafter in a manner known flows through the motor room 26 cooling the motor cylinder 6, whereafter the cooling air leaves the motor room through openings on the right-hand side of the power unit 1. Intake air is sucked in through port 145 into the nozzle tube 12. This air has been substantially cleaned of solid impurities through centrifugal action. The air cleaned so far is passed through the two united connection pieces 70, 112 directly up into the expansion and distribution space 14 in the pre-filter chamber 13 under the pre-filter 15. Thanks to the ring 55, which extends down to the pre-filter 15 from the roof of the filter cover 27, the suction through the pre-filter immediately above the opening in the filter bottom will be minimal. This contributes to an expansion of the air and a distribution of the air into all parts of the space 14 under the pre-filter 15. From the opening 68 in the filter bottom, part of the air thus flows forwardly towards the front wall 33 of the filter cover, which is facilitated by the bent shape of the connection piece 70. Some air also flows into the space adjacent to the front wall and through the space 83 adjacent to the right-hand side wall 32 and through the space 87 adjacent to the leer-hand side wall 31 rearwards to the space 88 adjacent to the rear wall 34 of the filter cover. From this space 88, air flows up through the channels between the fins 89 forwards to the distribution and expansion space in the oval trench shaped depression 86. Some air also flows to this space directly over that part of the filter bottom which form the roof 71 of the main filter chamber 18 in the channels between the fins 85 to said distribution space 86.

In this way the air is expanded and distributed comparatively evenly in the space under the pre-filter 15, from where it is sucked up through the pre-filter 15 to the closed hood space 16 between the roof 30 of the filter cover 27 and the pre-filter 15.

As the pre-filter chamber 13 is closed to the outside, the filter bottom 28 being clamped between the filter cover 27 and the cylinder cover 29 essentially to prevent air being sucked into the chamber from outside. Some leakage between the environment and the space 14 under the pre-filter 15, i.e. to the dirty side of the pre-filter chamber, however, is not serious, and therefore no seal between the lower circumferential edge of the filter cover and the rim portion 60, 61 of the filter bottom is provided.

The majority of all impurities, which are sucked up into the pre-filter 15, get caught in the filter by sticking to the oil in the filter and/or are stopped by the filter and falls down on the filter bottom 28, where they are collected.

In the closed hood space 16 under the roof 30 the air is sucked and guided by means of the fins A1, B1 . . . K1 towards the opening 46, so that the flow will be comparatively even between the different channels between the fins, which also contributes to an even loading of the pre-filter 15 over its entire surface.

The air is sucked through the longitudinal opening 46 and further down through passage 17 to the main filter chamber 18 existing under the rear part 71 of the filter bottom. This one is, as distinguished from the pre-filter chamber 13, air-tightly sealed by means of rubber seals, namely the rubber seal 79 in the groove 78 around the passage 17 and the rubber string 110 in the groove 107, 107A, 107B, 107C, and 107D in the upper edge of the cylinder cover 29. This prevents leak air from being sucked into the main filter chamber 18 from the dirty part of the pre-filter chamber, i.e. from the expansion and distribution space 14 under the pre-filter body 15 and from the environment, respectively. The main filter 19, which covers the opening 22 to the manifold 23, also functions as a safety which prevents impurities from entering the carburetor in connection with the removing of the unit consisting of the filter cover 27, the pre-filter 15 and the filter bottom 28, e.g. for cleaning, change of spark plug, etc.

In the main filter chamber 18 the air is expanded again, which is possible through an optimal use of all available spaces in the design. These spaces include the interior of the elevated part 72 of the filter bottom, including the space 75; the space 91 under the rear, transverse part 90 of the filter bottom; and the spaces between the wall of the cylinder cover and the filter cylinder 128. The air is thus distributed to all spaces around the filter cylinder 28 of the main filter 19 and is sucked through the paper filter cylinder 128 into the exit space 21 in the cavity 129 and from there through the opening 22 in the cylinder cover into the manifold 23 and finally into the carburetor 9, the roof 130 and the sealing ring 134 preventing air from leaking, by passing the paper filter 128 into the exit space 21 and from there into the manifold 23.

We claim:

1. A cutting or sawing machine powered by an internal combustion engine and comprising a cutting unit and a power unit, said power unit comprising:
    a motor room;
    an air-cooled motor cylinder positioned within said motor room;
    a cylinder cover disposed at least partly about said air-cooled motor cylinder;
    a fan housing; and
    a rotatably driven impeller including impeller wings disposed within said fan housing which operate to propel a cooling air flow towards the periphery of said fan housing and between said motor cylinder and said cylinder cover;
    wherein a first filter chamber with a first filter for intake air for the internal combustion engine is positioned over the cylinder cover on an opposite side of the cylinder cover from the impeller, and a nozzle tube for the intake air is provided which extends from an intake port close to the periphery of the impeller through the motor room and terminates in said first filter chamber.

2. The machine according to claim 1, wherein a part of the cylinder cover forms a roof of the motor room, said first filter chamber including an opening for receiving said nozzle tube in that part of the cylinder cover which forms the roof of the motor room.

3. The machine according to claim 2, wherein said opening in the cylinder cover is located radially outward from the impeller in a plane of rotation thereof.

4. The machine according to claim 3, wherein the nozzle tube extends substantially tangentially relative to the impeller from the intake port close to the periphery of the impeller to said opening in the cylinder cover.

5. The machine according to claim 4, wherein a side wall of the cylinder cover, on the impeller side of the cylinder cover, is connected to said fan housing, and the nozzle tube extends through the motor room at a distance from that side wall of the cylinder cover which is connected to said fan housing on the impeller side of the cylinder cover, so that cooling air can flow between the nozzle tube and the side wall of the cylinder cover to cool the motor cylinder.

6. The machine according to claim 5, further comprising at least one vertical transition wall extending from the cylinder cover between a portion of the motor room, which houses the motor cylinder and an ignition module, and a space housing a carburetor and an intake nozzle to the carburetor, wherein the nozzle tube extends through the motor room at a distance from said transition wall so that the cooling air can flow between the nozzle tube and said transition wall for cooling the engine.

7. The machine according to claim 6, wherein the cylinder cover has a depression forming part of a second filter chamber, and the opening for the intake air in the cylinder cover is located in a portion of said cylinder cover closer to said cutting unit than said depression.

8. The machine according to claim 7, wherein the nozzle tube extends between, on one hand, said vertical transition wall and said depression in the cylinder cover, and on the other hand, the ignition module of the engine.

9. The machine according to claim 1, wherein a cleaning system for the intake air of the engine comprises the following units, connected in series:
    a centrifugal cleaner comprising said nozzle tube;

a pre-filter comprising said first filter chamber and said first filter extending substantially horizontal and covering substantially the whole cylinder cover; and a second filter which is a main filter and which is provided in a main filter chamber covered by the pre-filter chamber.

10. The machine according to claim 9, wherein the first filter chamber has a pre-filter chamber floor having a projecting connection piece with an opening for receiving the intake air, said projecting connection piece being a male member which is inserted in a corresponding female connection piece in the cylinder cover, and wherein the two connection pieces are sealingly pressed against an end of the nozzle tube opposite the intake port of the nozzle tube.

* * * * *